(12) United States Patent
Xiang et al.

(10) Patent No.: US 12,474,381 B2
(45) Date of Patent: Nov. 18, 2025

(54) SIGNAL PROCESSING METHOD AND APPARATUS

(71) Applicant: HUAWEI TECHNOLOGIES CO., LTD., Guangdong (CN)

(72) Inventors: Chaobin Xiang, Chengdu (CN); Yang Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 18/513,821

(22) Filed: Nov. 20, 2023

(65) Prior Publication Data

US 2024/0085464 A1    Mar. 14, 2024

Related U.S. Application Data

(63) Continuation of application No. PCT/CN2021/095318, filed on May 21, 2021.

(51) Int. Cl.
*G01R 19/25* (2006.01)
*G01R 19/00* (2006.01)
*H02J 13/00* (2006.01)

(52) U.S. Cl.
CPC ..... *G01R 19/2509* (2013.01); *G01R 19/2513* (2013.01); *G01R 19/00* (2013.01); *H02J 13/00002* (2020.01); *H02J 13/00007* (2020.01)

(58) Field of Classification Search
CPC ............. G01R 19/2509; G01R 19/2513; G01R 23/02; H02J 13/00007; H02J 13/00002
See application file for complete search history.

(56) References Cited

U.S. PATENT DOCUMENTS 11,435,384 B2 * 9/2022 Wen .................. H02J 3/00

FOREIGN PATENT DOCUMENTS

| CN | 108710060 A | 10/2018 |
|---|---|---|
| CN | 109326114 A | 2/2019 |
| CN | 111092487 A | 5/2020 |
| CN | 111711469 A | 9/2020 |
| CN | 112600589 A | 4/2021 |
| CN | 112600859 A | 4/2021 |

OTHER PUBLICATIONS

PCT International Search Report for Application No. PCT/CN2021/095318 dated May 21, 2021, 9 pages.
Extended European Search Report for Application No. 21940242 dated May 21, 2024, 8 pages.

* cited by examiner

*Primary Examiner* — Joseph J Lauture

(57) ABSTRACT

This application provides a signal processing method and associated apparatuses. The method includes: a secondary node obtains first data and a plurality of pieces of second data; then, the secondary node determines a plurality of first similarity degrees based on the first data and the plurality of pieces of second data; and then, the secondary node determines a target primary node based on the plurality of first similarity degrees. The first data is power frequency cycle feature data collected by the secondary node in a target time period, the plurality of pieces of second data are power frequency cycle feature data respectively collected by a plurality of primary nodes in the target time period.

20 Claims, 5 Drawing Sheets

SIGNAL PROCESSING METHOD AND APPARATUS

CROSS-REFERENCE TO RELATED APPLICATION

This application is a continuation of International Application No. PCT/CN2021/095318, filed on May 21, 2021, the disclosure of which is hereby incorporated by reference in its entirety.

TECHNICAL FIELD

This application relates to the field of power technologies, and in particular, to a signal processing method and apparatus.

BACKGROUND

In a power supply area, electric energy is supplied to users through various links such as power transmission, power transformation, and power distribution of a power network. In transmission and distribution processes of electric energy, each element of the power network needs to generate a specific amount of active power loss and electric energy loss. Line loss electricity is usually obtained through subtraction between total "electricity supplied" and total "electricity sales" that are measured by an electricity meter. In the field of low-voltage power supply, "electricity supplied" in a transformer district may be directly obtained by a metering device of a power supply company, while "electricity sales" needs to be obtained through statistics collection based on a transformer district identification result, that is, whether the transformer district is accurately identified directly determines accuracy of a statistics collection result of "electricity sales". In a power system, one transformer district may indicate a power supply range or area of one transformer. Transformer district identification may also be referred to as user-transformer relationship identification, and means identifying a transformer district that is in a power network and to which a power grid device (for example, a smart switch, an electricity meter, or a collector) in the power network belongs.

However, identification accuracy of an existing user-transformer relationship identification method is relatively low, and therefore it is prone to misidentify a user-transformer relationship, and a reliable basis cannot be provided for calculating line loss electricity.

SUMMARY

This application provides a signal processing method and apparatus, to effectively improve accuracy of user-transformer relationship identification.

According to a first aspect, this application provides a signal processing method. The method includes: a secondary node obtains first data and a plurality of pieces of second data; then, the secondary node determines a plurality of first similarity degrees based on the first data and the plurality of pieces of second data; and then, the secondary node determines a target primary node based on the plurality of first similarity degrees. The first data is power frequency cycle feature data collected by the secondary node in a target time period, the power frequency cycle feature data is used to indicate a cycle feature of a power grid working frequency, the plurality of pieces of second data are power frequency cycle feature data respectively collected by a plurality of primary nodes in the target time period, the plurality of pieces of second data are in a one-to-one correspondence with the plurality of primary nodes, the plurality of first similarity degrees are in a one-to-one correspondence with the plurality of primary nodes, and the target primary node is one of the plurality of primary nodes.

In the conventional technology, a primary node (a target primary node) in a transformer district to which a secondary node belongs is determined by using power frequency cycle feature data respectively collected by a plurality of primary nodes in different time periods. According to the signal processing method provided in this application, power frequency cycle feature data respectively collected by the secondary node and the plurality of primary nodes in a same time period (the target time period) may be obtained, and then the target primary node may be determined based on the power frequency cycle feature data respectively collected by the secondary node and the plurality of primary nodes in the same time period. Power frequency cycle feature data respectively collected by the plurality of primary nodes in the same time period has a higher distinguishing degree than power frequency cycle feature data respectively collected by the plurality of primary nodes in different time periods. Therefore, the signal processing method provided in this application has higher accuracy compared with an existing user-transformer relationship identification method, and therefore can effectively improve accuracy of user-transformer relationship identification, and can provide a reliable basis for calculating line loss electricity.

Optionally, the power frequency cycle feature data includes N power frequency zero-crossing moments, and N is a positive integer. For example, the power frequency cycle feature data may include 1000 power frequency zero-crossing moments.

Optionally, the power frequency zero-crossing moment may include at least one of the following: a zero-crossing moment of a power frequency voltage rising edge, a zero-crossing moment of a power frequency voltage falling edge, a zero-crossing moment of a power frequency current rising edge, or a zero-crossing moment of a power frequency current falling edge. For example, the power frequency zero-crossing moment may include only the zero-crossing moment of the power frequency voltage falling edge.

In a possible implementation, before the plurality of pieces of second data are obtained, the method further includes: the secondary node transmits second indication information to the plurality of primary nodes, where the second indication information is used to indicate each of the plurality of primary nodes to collect power frequency cycle feature data in the target time period.

In this way, the second indication information is transmitted to the plurality of primary nodes, so that the plurality of primary nodes can collect the power frequency cycle feature data in the same time period.

In a possible implementation, that the secondary node determines a target primary node based on the plurality of first similarity degrees includes: the secondary node determines whether a first primary node meets a target condition, where the first primary node is a primary node with a highest first similarity degree in the plurality of primary nodes; and if the first primary node meets the target condition, the secondary node determines that the first primary node is the target primary node; or if the first primary node does not meet the target condition, the secondary node obtains first information of a plurality of transformer districts and determines the target primary node based on the first information of the plurality of transformer districts, where the plurality of transformer districts include transformer districts in which the plurality of primary nodes are located.

In this way, it is determined whether the first primary node meets the target condition, so that it can be determined whether the power frequency cycle feature data of the plurality of primary nodes has a relatively high distinguishing degree. When the power frequency cycle feature data of the plurality of primary nodes does not have a relatively high distinguishing degree, the target primary node is determined by using the first information of the plurality of transformer districts corresponding to the plurality of primary nodes, to ensure accuracy of user-transformer relationship identification.

Optionally, the first information may include at least one of the following: a lowest effective layer, a signal-to-noise ratio (signal noise ratio, SNR) value, or an attenuation value. For example, the first information may include the lowest effective layer, the SNR, and the attenuation value.

In a possible implementation, that the secondary node determines whether a first primary node meets a target condition includes: the secondary node determines a first difference based on the plurality of first similarity degrees, where the first difference is a difference between a highest first similarity degree in the plurality of first similarity degrees and a second highest first similarity degree in the plurality of first similarity degrees; and if the first difference is greater than a first threshold, the secondary node determines that the first primary node meets the target condition; or if the first difference is less than or equal to the first threshold, the secondary node determines that the first primary node does not meet the target condition.

In this way, it can be determined, based on a value of the first difference, whether the power frequency cycle feature data of the plurality of primary nodes has a relatively high distinguishing degree.

When the first difference is greater than the first threshold, it indicates that power frequency cycle feature data of each primary node other than the first primary node in the plurality of primary nodes is not similar to the power frequency cycle feature data of the secondary node. In this case, the power frequency cycle feature data of the primary nodes has a relatively high distinguishing degree, and a user-transformer relationship can be accurately identified by using the power frequency cycle feature data of the plurality of primary nodes. Therefore, the first primary node can be determined as the target primary node.

On the contrary, when the first difference is less than or equal to the first threshold, it indicates that a primary node whose first similarity degree approximates to that of the first primary node exists in the plurality of primary nodes. In this case, power frequency cycle feature data of the primary node is also extremely similar to the power frequency cycle feature data of the secondary node, and the primary node may also be the target primary node. In this case, the power frequency cycle feature data does not have a relatively high distinguishing degree, and a user-transformer relationship may not be accurately identified by using the power frequency cycle feature data of the plurality of primary nodes.

In another possible implementation, that the secondary node determines whether a first primary node meets a target condition includes: the secondary node determines a plurality of second similarity degrees based on the plurality of pieces of second data, where the plurality of second similarity degrees are respectively used to indicate similarity degrees between second data corresponding to all primary nodes other than the first primary node in the plurality of primary nodes and second data corresponding to the first primary node; and if all the plurality of second similarity degrees are less than a second threshold, the secondary node determines that the first primary node meets the target condition; or if not all the plurality of second similarity degrees are less than the second threshold, the secondary node determines that the first primary node does not meet the target condition.

In this way, it can be determined, based on values of the second similarity degrees, whether the power frequency cycle feature data of the plurality of primary nodes has a relatively high distinguishing degree.

When all the plurality of second similarity degrees are less than the second threshold, it indicates that similarity degrees between power frequency cycle feature data of the plurality of primary nodes except the first primary node and power frequency cycle feature data of the first primary node are not very high. In this case, the power frequency cycle feature data has a relatively high distinguishing degree, and a user-transformer relationship can be accurately identified by using the power frequency cycle feature data of the plurality of primary nodes. Therefore, the first primary node can be determined as the target primary node.

On the contrary, when all the plurality of second similarity degrees are greater than or equal to the second threshold, it indicates that a primary node whose power frequency cycle feature data approximates to that of the first primary node exists in the plurality of primary nodes except the first primary node. In this case, a transformer district of the primary node may also be the target primary node. In this case, the power frequency cycle feature data of the primary nodes does not have a relatively high distinguishing degree, and a user-transformer relationship may not be accurately identified by using the power frequency cycle feature data of the plurality of primary nodes.

Optionally, the second information includes a transformer district identifier, a layer, an SNR value, and an attenuation value.

In a possible implementation, that the secondary node obtains first information of a plurality of transformer districts includes: the secondary node obtains a plurality of target packets, where the target packets are packets sent by a plurality of nodes in the plurality of transformer districts within preset time; the secondary node determines second information of a plurality of first nodes in the plurality of transformer districts based on the plurality of target packets; and the secondary node determines the first information of the plurality of transformer districts based on the second information of the plurality of first nodes, where the first node is a node that meets a first condition in the plurality of nodes.

Optionally, the first condition includes at least one of the following: a quantity of packets sent to the secondary node within the preset time is greater than a sixth threshold, an SNR value is greater than a seventh threshold, or an attenuation value is less than an eighth threshold.

In a possible implementation, that the secondary node determines the first information of the plurality of transformer districts based on the second information of the plurality of first nodes includes: the secondary node determines a lowest effective layer of a first transformer district based on layers of a plurality of first nodes in the first transformer district, where the first transformer district is any one of the plurality of transformer districts; the secondary node determines an SNR value of the first transformer district based on SNR values of the plurality of first nodes in the first transformer district, where the second node is a node at a lowest layer in the plurality of first nodes in the first transformer district; and the secondary node determines an attenuation value of the first transformer district based on attenuation values of the plurality of first nodes in the first transformer district.

In another possible implementation, that the secondary node determines the first information of the plurality of transformer districts based on the second information of the plurality of first nodes includes: the secondary node determines a lowest effective layer of a first transformer district based on layers of a plurality of first nodes in the first transformer district, where the first transformer district is any one of the plurality of transformer districts; the secondary node determines an SNR value of the first transformer district based on an SNR value of a second node, where the second node is a node at a lowest layer in the plurality of first nodes in the first transformer district; and the secondary node determines an attenuation value of the first transformer district based on an attenuation value of the second node.

In a possible implementation, the determining the target primary node based on the first information of the plurality of transformer districts includes: if there is only one second transformer district in the plurality of transformer districts, the secondary node determines that a primary node in the second transformer district is the target primary node, where the second transformer district is a transformer district whose lowest effective layer is the lowest in the plurality of transformer districts; or if there are a plurality of second transformer districts in the plurality of transformer districts, the secondary node determines the target primary node based on SNR values of the plurality of second transformer districts and attenuation values of the plurality of second transformer districts.

In this way, when layers of the plurality of primary nodes have a relatively high distinguishing degree, the target primary node can be directly determined by using the layers of the plurality of primary nodes. On the contrary, when the layers of the plurality of primary nodes do not have a relatively high distinguishing degree, the target primary node is determined by using other information. Therefore, accuracy of user-transformer relationship identification is ensured.

In a possible implementation, the determining the target primary node from the plurality of second transformer districts based on SNR values of the plurality of second transformer districts and attenuation values of the plurality of second transformer districts includes: the secondary node determines a second difference based on the SNR values of the plurality of second transformer districts, where the second difference is a difference between an SNR value of a third transformer district and an SNR value of a fourth transformer district, the third transformer district is a second transformer district with a largest SNR value in the plurality of second transformer districts, and the fourth transformer district is a transformer district with a second largest SNR value in the plurality of second transformer districts; and if the second difference is greater than or equal to a third threshold, the secondary node determines the target primary node based on the SNR values of the plurality of second transformer districts; or if the second difference is less than the third threshold, the secondary node determines the target primary node based on the attenuation values of the plurality of second transformer districts.

For example, if the second difference is greater than or equal to the third threshold, the secondary node determines that the target primary node is a primary node in the third transformer district; or if the second difference is less than the third threshold, the secondary node determines that the target primary node is a primary node in a transformer district with a smaller attenuation value in the third transformer district and the fourth transformer district.

In this way, it can be determined, by using the second difference, whether SNR data has a relatively high distinguishing degree. When the SNR data has a relatively high distinguishing degree, the target primary node is directly determined by using the SNR data. On the contrary, when the SNR data does not have a relatively high distinguishing degree, the target primary node is determined by using attenuation value data. Therefore, accuracy of user-transformer relationship identification is ensured.

In another possible implementation, the determining the target primary node from the plurality of second transformer districts based on SNR values of the plurality of second transformer districts and attenuation values of the plurality of second transformer districts includes: if an attenuation value of a fifth transformer district is less than a fourth threshold, the secondary node determines the target primary node based on the attenuation values of the plurality of second transformer districts, where the fifth transformer district is a transformer district with a smallest attenuation value in the plurality of second transformer districts; or if the attenuation value of the fifth transformer district is greater than or equal to the fourth threshold, the secondary node determines the target primary node based on the SNR values of the plurality of second transformer districts.

For example, if the attenuation value of the fifth transformer district is less than the fourth threshold, the secondary node determines that the target primary node is a primary node in the fifth transformer district; or if the attenuation value of the fifth transformer district is greater than or equal to the fourth threshold, the secondary node determines that the target primary node is a primary node in a sixth transformer district, where the sixth transformer district is a transformer district with a largest SNR value in the plurality of second transformer districts.

In this way, it can be determined whether attenuation value data has a relatively high distinguishing degree. When the attenuation value data has a relatively high distinguishing degree, the target primary node is directly determined by using the attenuation values. On the contrary, when the attenuation value data does not have a relatively high distinguishing degree, the target primary node is determined by using SNR data. Therefore, accuracy of user-transformer relationship identification is ensured.

In still another possible implementation, the determining the target primary node from the plurality of second transformer districts based on SNR values of the plurality of second transformer districts and attenuation values of the plurality of second transformer districts includes: if an SNR value of a sixth transformer district is greater than a fifth threshold, the secondary node determines the target primary node based on the SNR values of the plurality of second transformer districts, where the sixth transformer district is a transformer district with a largest SNR value in the plurality of second transformer districts; or if the SNR value of the sixth transformer district is less than or equal to the fifth threshold, the secondary node determines the target primary node based on the attenuation values of the plurality of second transformer districts.

For example, if the SNR value of the sixth transformer district is greater than the fifth threshold, the secondary node determines that the target primary node is a primary node in the sixth transformer district; or if the SNR value of the sixth transformer district is less than or equal to the fifth threshold, the secondary node determines that the target primary node is the primary node in the fifth transformer district.

In this way, it can be determined whether SNR data has a relatively high distinguishing degree. When the SNR data has a relatively high distinguishing degree, the target primary node is directly determined by using the SNR data. On the contrary, when the SNR data does not have a relatively high distinguishing degree, the target primary node is determined by using attenuation value data. Therefore, accuracy of user-transformer relationship identification is ensured.

According to a second aspect, this application provides another signal processing method. The method includes: a second primary node obtains first data, where the first data is power frequency cycle feature data collected by a secondary node in a target time period, and the power frequency cycle feature data is used to indicate a cycle feature of a power grid working frequency; the second primary node obtains a plurality of pieces of second data, where the plurality of pieces of second data include power frequency cycle feature data respectively collected by a plurality of primary nodes in the target time period, the plurality of primary nodes include the second primary node, and the plurality of pieces of second data are in a one-to-one correspondence with the plurality of primary nodes; the second primary node determines a plurality of first similarity degrees based on the first data and the plurality of pieces of second data, where the plurality of first similarity degrees are in a one-to-one correspondence with the plurality of primary nodes; and the second primary node determines a target primary node based on the plurality of first similarity degrees, where the target primary node is one of the plurality of primary nodes.

Optionally, the power frequency cycle feature data includes N power frequency zero-crossing moments, and N is a positive integer.

Optionally, the power frequency zero-crossing moment may include at least one of the following: a zero-crossing moment of a power frequency voltage rising edge, a zero-crossing moment of a power frequency voltage falling edge, a zero-crossing moment of a power frequency current rising edge, or a zero-crossing moment of a power frequency current falling edge.

In a possible implementation, before the second primary node obtains the plurality of pieces of second data, the method further includes: the second primary node sends second indication information to third primary nodes, where the second indication information is used to indicate each of the third primary nodes to collect power frequency cycle feature data in the target time period, and the third primary nodes include all primary nodes other than the second primary node in the plurality of primary nodes.

In a possible implementation, that the second primary node determines a target primary node based on the plurality of first similarity degrees includes: the second primary node determines whether a first primary node meets a target condition, where the first primary node is a primary node with a highest first similarity degree in the plurality of primary nodes; and if the first primary node meets the target condition, the second primary node determines that the first primary node is the target primary node; or if the first primary node does not meet the target condition, the second primary node obtains first information of a plurality of transformer districts and determines the target primary node based on the first information of the plurality of transformer districts.

Optionally, the first information includes at least one of the following: a lowest effective layer, a signal-to-noise ratio SNR value, or an attenuation value.

In another possible implementation, that the second primary node determines a target primary node based on the plurality of first similarity degrees includes: the second primary node determines whether a first primary node meets a target condition, where the first primary node is a primary node with a highest first similarity degree in the plurality of primary nodes; and if the first primary node meets the target condition, the second primary node determines that the first primary node is the target primary node; or if the first primary node does not meet the target condition, the second primary node sends a first request to the secondary node and receives a first result sent by the secondary node. The first request is used to request the target result, and the target result is used to indicate the target primary node.

In a possible implementation, that the second primary node determines whether a first primary node meets a target condition includes: the second primary node determines a first difference based on the plurality of first similarity degrees, where the first difference is a difference between a highest first similarity degree in the plurality of first similarity degrees and a second highest first similarity degree in the plurality of first similarity degrees; and if the first difference is greater than a first threshold, the second primary node determines that the first primary node meets the target condition; or if the first difference is less than or equal to the first threshold, the second primary node determines that the first primary node does not meet the target condition.

In another possible implementation, that the second primary node determines whether a first primary node meets a target condition includes: the second primary node determines a plurality of second similarity degrees based on the plurality of pieces of second data, where the plurality of second similarity degrees are respectively used to indicate similarity degrees between second data corresponding to all primary nodes other than the first primary node in the plurality of primary nodes and second data corresponding to the first primary node; and if all the plurality of second similarity degrees are less than a second threshold, the second primary node determines that the first primary node meets the target condition; or if not all the plurality of second similarity degrees are less than the second threshold, the second primary node determines that the first primary node does not meet the target condition.

In a possible implementation, that the second primary node obtains first information of a plurality of transformer districts includes: the second primary node sends a second request to the secondary node, where the second request is used to request the first information of the plurality of transformer districts; and the second primary node receives the first information of the plurality of transformer districts that is sent by the secondary node.

In a possible implementation, the determining the target primary node based on the first information of the plurality of transformer districts includes: if there is only one second transformer district in the plurality of transformer districts, the second primary node determines that a primary node in the second transformer district is the target primary node, where the second transformer district is a transformer district whose lowest effective layer is the lowest in the plurality of transformer districts; or if there are a plurality of second transformer districts in the plurality of transformer districts, the second primary node determines the target primary node based on SNR values of the plurality of second transformer districts and attenuation values of the plurality of second transformer districts.

In a possible implementation, that the second primary node determines the target primary node based on SNR values of the plurality of second transformer districts and attenuation values of the plurality of second transformer districts includes: the second primary node determines a second difference based on the SNR values of the plurality of second transformer districts, where the second difference is a difference between an SNR value of a third transformer district and an SNR value of a fourth transformer district, the third transformer district is a second transformer district with a largest SNR value in the plurality of second transformer districts, and the fourth transformer district is a transformer district with a second largest SNR value in the plurality of second transformer districts; and if the second difference is greater than or equal to a third threshold, the secondary node determines the target primary node based on the SNR values of the plurality of second transformer districts; or if the second difference is less than the third threshold, the secondary node determines the target primary node based on the attenuation values of the plurality of second transformer districts.

In another possible implementation, that the second primary node determines the target primary node from the plurality of second transformer districts based on SNR values of the plurality of second transformer districts and attenuation values of the plurality of second transformer districts includes: if an attenuation value of a fifth transformer district is less than a fourth threshold, the secondary node determines the target primary node based on the attenuation values of the plurality of second transformer districts, where the fifth transformer district is a transformer district with a smallest attenuation value in the plurality of second transformer districts; or if the attenuation value of the fifth transformer district is greater than or equal to the fourth threshold, the secondary node determines the target primary node based on the SNR values of the plurality of second transformer districts.

In still another possible implementation, that the second primary node determines the target primary node from the plurality of second transformer districts based on SNR values of the plurality of second transformer districts and attenuation values of the plurality of second transformer districts includes: if an SNR value of a sixth transformer district is greater than a fifth threshold, the secondary node determines the target primary node based on the SNR values of the plurality of second transformer districts, where the sixth transformer district is a transformer district with a largest SNR value in the plurality of second transformer districts; or if the SNR value of the sixth transformer district is less than or equal to the fifth threshold, the secondary node determines the target primary node based on the attenuation values of the plurality of second transformer districts.

According to a third aspect, this application provides still another signal processing method. The method includes: first, a secondary node receives a first request that is used to request a target result and that is sent by a second primary node; then, the secondary node obtains first information of a plurality of transformer districts; then, the secondary node determines a target primary node based on the first information of the plurality of transformer districts; and then, the secondary node sends, to the second primary node, the target result used to indicate the target primary node. The first information includes at least one of the following: a lowest effective layer, an SNR value, or an attenuation value, the plurality of transformer districts include transformer districts of a plurality of primary nodes, the plurality of primary nodes are in a one-to-one correspondence with the plurality of transformer districts, the target primary node is one of the plurality of primary nodes, and the plurality of primary nodes include the second primary node.

In the conventional technology, a primary node (a target primary node) in a transformer district to which a secondary node belongs is determined by using SNR data of transformer districts. In some scenarios (for example, a scenario in which an environment noise is extremely high or an environment noise is extremely low), SNR data of transformer districts has a relatively low distinguishing degree. In this case, a target primary node cannot be accurately determined by using only the SNR data. In this application, when the target primary node is determined, in addition to SNR data, a lowest effective layer and an attenuation value are further considered. Therefore, the signal processing method provided in this application has higher accuracy compared with an existing user-transformer relationship identification method, and therefore can effectively improve accuracy of user-transformer relationship identification, and can provide a reliable basis for calculating line loss electricity.

In a possible implementation, that the secondary node obtains first information of a plurality of transformer districts includes: the secondary node obtains a plurality of target packets, where the target packets are packets sent by a plurality of nodes in the plurality of transformer districts within preset time; the secondary node determines second information of a plurality of first nodes in the plurality of transformer districts based on the plurality of target packets, where the second information includes a transformer district identifier, a layer, an SNR value, and an attenuation value, and the first node is a node that meets a first condition in the plurality of nodes; and the secondary node determines the first information of the plurality of transformer districts based on the second information of the plurality of first nodes.

Optionally, the first condition includes at least one of the following: a quantity of packets sent to the secondary node within the preset time is greater than a sixth threshold, an SNR value is greater than a seventh threshold, or an attenuation value is less than an eighth threshold.

In a possible implementation, that the secondary node determines the first information of the plurality of transformer districts based on the second information of the plurality of first nodes includes: the secondary node determines a lowest effective layer of a first transformer district based on layers of a plurality of first nodes in the first transformer district, where the first transformer district is any one of the plurality of transformer districts; the secondary node determines an SNR value of the first transformer district based on SNR values of the plurality of first nodes in the first transformer district or an SNR value of a second node, where the second node is a node at a lowest layer in the plurality of first nodes in the first transformer district; and the secondary node determines an attenuation value of the first transformer district based on attenuation values of the plurality of first nodes in the first transformer district or an attenuation value of the second node.

In a possible implementation, that the secondary node determines the target primary node based on the first information of the plurality of transformer districts includes: if there is only one second transformer district in the plurality of transformer districts, the secondary node determines that a primary node in the second transformer district is the target primary node, where the second transformer district is a transformer district whose lowest effective layer is the lowest in the plurality of transformer districts; or if there are a plurality of second transformer districts in the plurality of transformer districts, the secondary node determines the target primary node based on SNR values of the plurality of second transformer districts and attenuation values of the plurality of second transformer districts.

In a possible implementation, that the secondary node determines the target primary node based on SNR values of the plurality of second transformer districts and attenuation values of the plurality of second transformer districts includes: the secondary node determines a second difference based on the SNR values of the plurality of second transformer districts, where the second difference is a difference between an SNR value of a third transformer district and an SNR value of a fourth transformer district, the third transformer district is a transformer district with a largest SNR value in the plurality of second transformer districts, and the fourth transformer district is a transformer district with a second largest SNR value in the plurality of second transformer districts; and if the second difference is greater than or equal to a third threshold, the secondary node determines the target primary node based on the SNR values of the plurality of second transformer districts; or if the second difference is less than the third threshold, the secondary node determines the target primary node based on the attenuation values of the plurality of second transformer districts.

In another possible implementation, that the secondary node determines the target primary node based on SNR values of the plurality of second transformer districts and attenuation values of the plurality of second transformer districts includes: if an attenuation value of a fifth transformer district is less than a fourth threshold, the secondary node determines the target primary node based on the attenuation values of the plurality of second transformer districts, where the fifth transformer district is a transformer district with a smallest attenuation value in the plurality of second transformer districts; or if the attenuation value of the fifth transformer district is greater than or equal to the fourth threshold, the secondary node determines the target primary node based on the SNR values of the plurality of second transformer districts.

In still another possible implementation, that the secondary node determines the target primary node based on SNR values of the plurality of second transformer districts and attenuation values of the plurality of second transformer districts includes: if an SNR value of a sixth transformer district is greater than a fifth threshold, the secondary node determines the target primary node based on the SNR values of the plurality of second transformer districts, where the sixth transformer district is a transformer district with a largest SNR value in the plurality of second transformer districts; or if the SNR value of the sixth transformer district is less than or equal to the fifth threshold, the secondary node determines the target primary node based on the attenuation values of the plurality of second transformer districts.

According to a fourth aspect, an embodiment of this application further provides a signal processing apparatus, configured to perform the method according to any one of the foregoing aspects or the possible implementations of the foregoing aspects. Specifically, the signal processing apparatus may include units configured to perform the method according to any one of the foregoing aspects or the possible implementations of the foregoing aspects.

Optionally, the signal processing apparatus may be the foregoing secondary node or the foregoing second primary node.

According to a fifth aspect, an embodiment of this application further provides a signal processing apparatus. The apparatus includes a memory, at least one processor, a transceiver, and instructions that are stored in the memory and that can be run on the processor. Further, the memory, the processor, and a communication interface communicate with each other through an internal connection path. The at least one processor executes the instructions, to enable the signal processing apparatus to implement the method according to any one of the foregoing aspects or the possible implementations of the foregoing aspects.

Optionally, the signal processing apparatus may be the foregoing secondary node or the foregoing second primary node.

According to a sixth aspect, this application further provides a computer-readable storage medium, configured to store a computer program. The computer program includes instructions used to implement the method according to any one of the foregoing aspects or the possible implementations of the foregoing aspects.

According to a seventh aspect, an embodiment of this application further provides a computer program product including instructions. When the computer program product is run on a computer, the computer is enabled to implement the method according to any one of the foregoing aspects or the possible implementations of the foregoing aspects.

The signal processing method, the signal processing apparatus, the computer storage medium, and the computer program product provided in the embodiments are all configured to perform the signal processing method provided above. Therefore, for beneficial effects that can be achieved by the signal processing apparatus, the computer storage medium, and the computer program product, refer to the beneficial effects in the signal processing method provided above. Details are not described herein again.

DESCRIPTION OF EMBODIMENTS

The following clearly describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

The term "and/or" in this application describes only an association relationship for describing associated objects and represents that three relationships may exist. For example, A and/or B may represent the following three cases: Only A exists, both A and B exist, and only B exists.

In the specification and accompanying drawings of this application, the terms "first", "second", and the like are intended to distinguish between different objects or distinguish between different processing of a same object, but do not indicate a particular order of the objects.

In addition, the terms "include", "have", and any other variant thereof in the description of this application are intended to cover a non-exclusive inclusion. For example, a process, a method, a system, a product, or a device that includes a series of steps or units is not limited to the listed steps or units, but optionally further includes another unlisted step or unit, or optionally further includes another inherent step or unit of the process, the method, the system, the product, or the device.

It should be noted that in the description of the embodiments of this application, the words such as "an example" or "for example" are used to represent giving an example, an illustration, or a description. Any embodiment or design solution described as "an example" or "for example" in the embodiments of this application should not be interpreted as being more preferred or having more advantages than another embodiment or design solution. Exactly, use of the words such as "an example" or "for example" is intended to present a relative concept in a specific manner.

In the description of this application, unless otherwise specified, "a plurality of" means two or more.

Some terms in this application are first described, to help a person skilled in the art to have a better understanding.

Power Frequency:

The power frequency may represent a rated frequency used by power generation, transmission, transformation, and distribution devices in a power system and industrial and civil electrical devices. A unit of the power frequency is hertz (HZ). For a standard power frequency of 50 Hz, each power frequency cycle is 20 milliseconds (MS).

Figure 1:
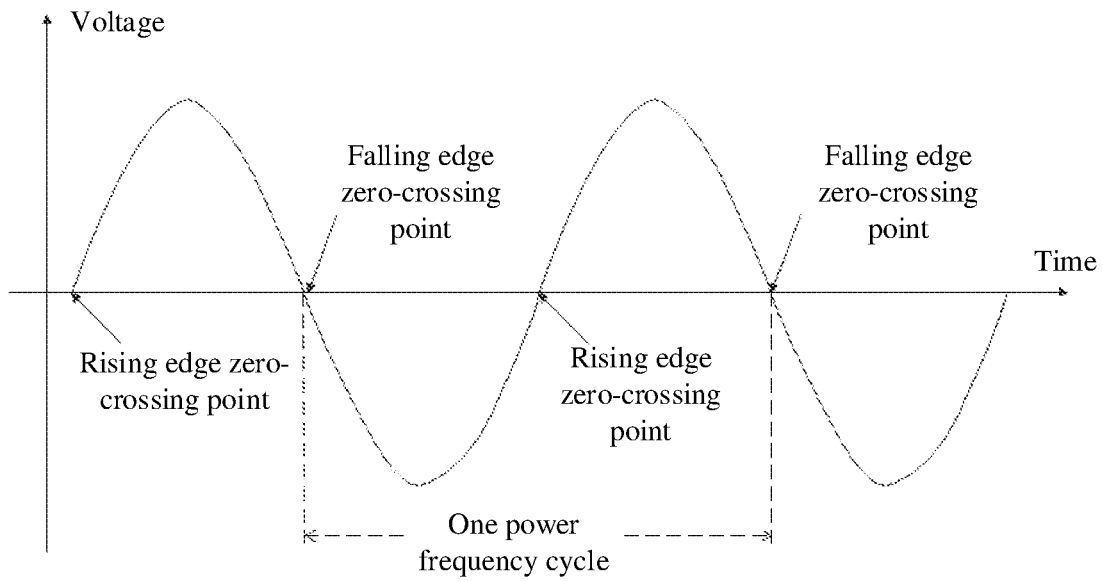
FIG. 1 is a diagram of a power frequency waveform of a power line.

Power Frequency Zero-Crossing Point:

A point at which a voltage or a current is zero in a power frequency cycle may be referred to as the power frequency zero-crossing point. A power frequency waveform of a power line is shown in FIG. 1. The figure shows a waveform in which a voltage on the power line changes with time. It may be seen that there are two points at which voltages are zero in one power frequency cycle. Based on different voltage trends of the power frequency zero-crossing points, the power frequency zero-crossing points may be further classified into a zero-crossing point of a power frequency voltage rising edge and a zero-crossing point of a power frequency voltage falling edge. It may be understood that, in a waveform in which a current changes with time, a power frequency zero-crossing point is a point at which a current is zero.

Power Frequency Cycle Feature:

Generally, a zero-crossing point (for example, a zero-crossing point of a voltage falling edge) is used as a start point of each power frequency cycle. The power frequency cycle feature may be used to represent a change of a power frequency zero-crossing point, and may also be referred to as a power frequency zero-crossing moment feature. Power frequency cycle feature data of a time period includes N consecutive power frequency zero-crossing moments collected within the time period, and N is a positive integer (for example, 1000). The power frequency cycle feature data may be represented by a zero-crossing moment sequence. For example, power frequency cycle feature data of a moment 1 includes N consecutive power frequency zero-crossing moments starting from being collected from the moment 1, and the N power frequency zero-crossing moments are respectively $T_1$ to $T_N$. In this case, the power frequency cycle feature data of the moment 1 may be represented as $T_1, T_2, \ldots, T_N$. The power frequency cycle feature data may be alternatively represented by a power frequency cycle sequence. For example, power frequency cycle feature data of a moment 1 includes N consecutive power frequency zero-crossing moments starting being collected from the moment 1, the N power frequency zero-crossing moments are respectively $T_1$ to $T_N$, and $T_1$ is used as a network time base (NTB). In this case, the power frequency cycle feature data of the moment 1 may be represented as $T_2-T_1, T_3-T_2, \ldots, T_N-T_{N-1}$.

Figure 2:
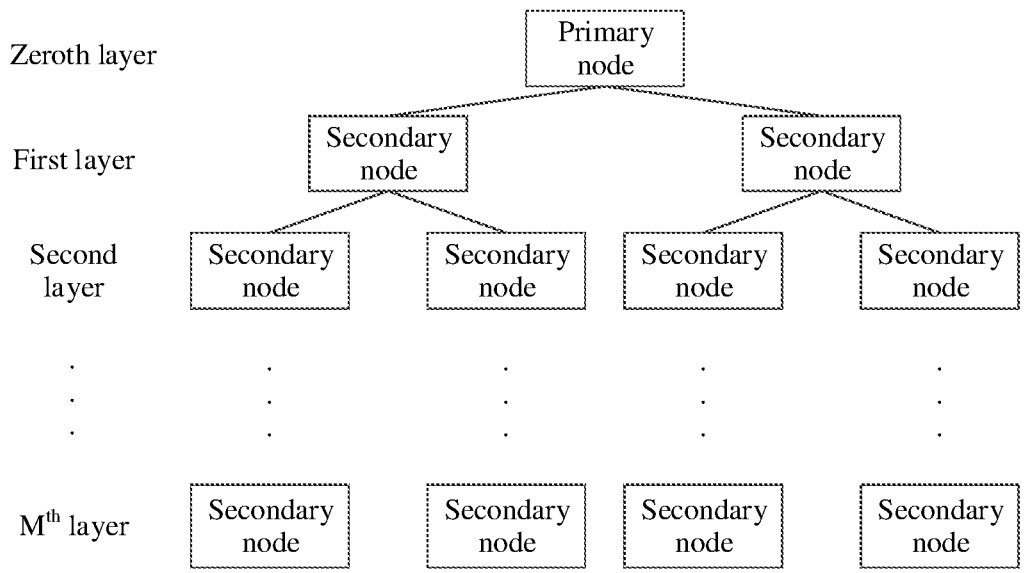
FIG. 2 is a schematic diagram of layers of a transformer district.

Layer:

The layer may represent a communication distance between a node in a transformer district and a primary node in the transformer district. One transformer district may include a plurality of layers. As shown in FIG. 2, a primary node in each transformer district is located at the zeroth layer of each transformer district, and a secondary node directly connected to the primary node in each transformer district is located at the first layer of the transformer district. A secondary node connected to the primary node by using one secondary node in each transformer district is located at the second layer of the transformer district. The layer may be alternatively determined based on other data, for example, may be determined based on signal strength between a secondary node and a primary node.

On an actual power line, due to impact of various factors (such as cabling and a load change), a position of a power frequency zero-crossing point of a node is always in a small fluctuation (usually in a microsecond level). There are different power frequency zero-crossing point change rules in different transformer districts due to different environmental factors such as cabling and load. Change rules in a same transformer district tend to be consistent. Therefore, a transformer district to which a node belongs may be determined based on a power frequency cycle feature of the node.

In the conventional technology, a primary node collects power frequency cycle feature data of the primary node and broadcasts the power frequency cycle feature data to a power network. A secondary node receives power frequency cycle feature data broadcast by each primary node, compares the power frequency cycle feature data with power frequency cycle feature data that is of a same moment and that is collected by the secondary node, and calculates a power frequency cycle feature similarity degree between the secondary node and each primary node; and then, determines that a transformer district in which a primary node with a highest power frequency cycle feature similarity degree with the secondary node is located is a transformer district of the secondary node.

However, a power frequency cycle feature of the node frequently changes, and an instantaneous power frequency cycle feature similarity degree between the secondary node and a primary node in each transformer district also continuously fluctuates. In an existing technical solution, power frequency cycle feature collection moments of adjacent primary nodes are not synchronized, and therefore power frequency cycle features of different moments have a low distinguishing degree, resulting in identification errors in some scenarios.

The following provides description by using an example in which a plurality of primary nodes include a primary node 1 and a primary node 2 and a secondary node actually belongs to the primary node 1. When power frequency cycle feature collection moments of two primary nodes are not aligned (power frequency cycle feature collection moments of the primary node 1 and the primary node 2 are not the same), power frequency cycle feature similarity degree data calculated by the secondary node is shown in Table 1.

TABLE 1

| Moment | 1 | 2 | 3 | 4 | 5 | 6 | 7 | 8 |
|---|---|---|---|---|---|---|---|---|
| Similarity degree with the primary node 1 | — | 80 | 30 | — | — | 20 | — | 30 |
| Similarity degree with the primary node 2 | 85 | — | — | 35 | 55 | — | 85 | — |

Referring to Table 1, it may be learned that, regardless of whether adjacent data is compared or an average value of power frequency cycle feature similarity degrees is calculated, a comprehensive power frequency cycle feature similarity degree with the primary node 2 is higher. However, referring to data that is obtained after power frequency cycle feature collection moments are aligned between the primary nodes and that is shown in Table 2, it may be learned that the secondary node actually has a higher power frequency cycle feature similarity degree with the primary node 1.

TABLE 2

| Moment | 1 | 2 | 3 | 4 | 5 | 6 | 7 | 8 |
|---|---|---|---|---|---|---|---|---|
| Similarity degree with the primary node 1 | 90 | 80 | 30 | 40 | 60 | 20 | 90 | 30 |
| Similarity degree with the primary node 2 | 85 | 75 | 25 | 35 | 55 | 15 | 85 | 25 |

In conclusion, it may be learned that, identification accuracy of an existing user-transformer relationship identification method is relatively low, and therefore it is prone to misidentify a user-transformer relationship, and a reliable basis cannot be provided for calculating line loss electricity. This greatly affects user experience.

In view of this, embodiments of this application provide a signal processing method and apparatus, to effectively improve accuracy of user-transformer relationship identification.

Figure 3:
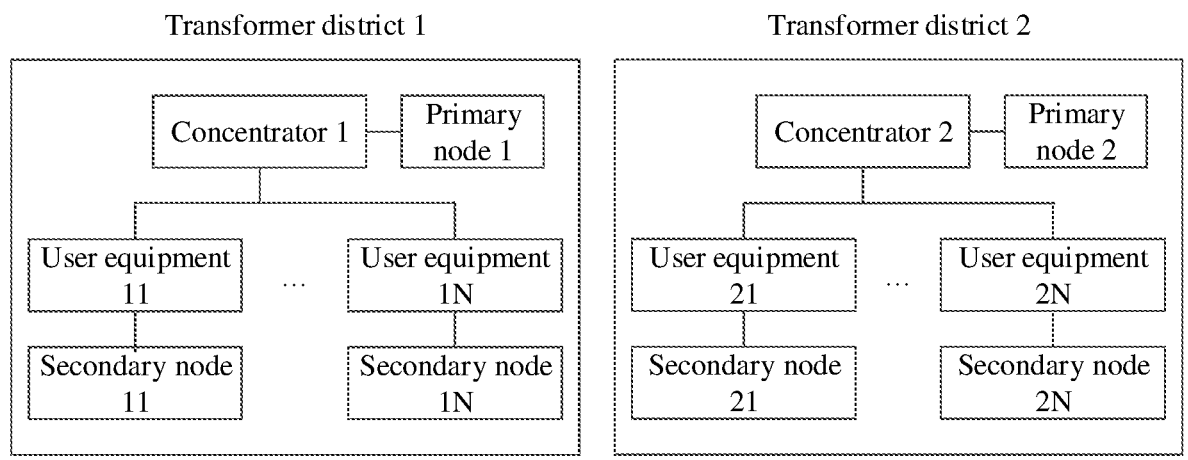
FIG. 3 is a schematic diagram of a structure of a power network according to an embodiment of this application.

The signal processing method provided in the embodiments of this application is applicable to a power network. FIG. 3 is a schematic block diagram of the power network. The power network includes two transformer districts: a transformer district 1 and a transformer district 2. Each transformer district includes one concentrator and N user equipment. One primary node is configured on each concentrator, one secondary node is configured on each user equipment, and N is a positive integer.

The user equipment may be a smart electricity meter, or may be a collector or another device. This is not limited in this embodiment of this application.

The primary node and the secondary node may communicate with each other. For example, the secondary node may send power frequency cycle feature data to the primary node by using a power line carrier (PLC).

Primary nodes in different transformer districts may communicate with each other in a plurality of manners. For example, primary nodes in different transformer districts may directly communicate with each other. For another example, primary nodes in different transformer districts may communicate with each other by using a secondary node. This is not limited in this embodiment of this application.

Optionally, the primary node may be integrated into the concentrator as a functional module or a chip apparatus. The primary node may alternatively exist in a separate form, that is, the primary node may be alternatively a separate device, apparatus, or the like. For example, the primary node may be connected to the concentrator by using a line (for example, a data line), or the primary node may be connected to the concentrator in another form such as a wireless network form. This is not limited in this embodiment of this application.

Optionally, the secondary node may also be integrated into the user equipment as a functional module or a chip apparatus. The secondary node may alternatively exist in a separate form, that is, the secondary node may be alternatively a separate device, apparatus, or the like. For example, the secondary node may be connected to the user equipment by using a line, or the secondary node may be connected to the user equipment in another form such as a wireless network form. This is not limited in this embodiment of this application.

In this embodiment of this application, a wireless network may be Ethernet, a radio access network (radio access network, RAN), a wireless local area network (WLAN), Bluetooth (BT), a global navigation satellite system (GNSS), frequency modulation (FM), a near field communication (NFC) technology, an infrared (IR) technology, or the like. This is not limited in this embodiment of this application.

It should be noted that this embodiment of this application is described merely by using an example in which the power network includes two transformer districts. In this embodiment of this application, a quantity of transformer districts may be alternatively another value (for example, 10, 100, or 1000). This is not limited in this embodiment of this application.

Figure 4:
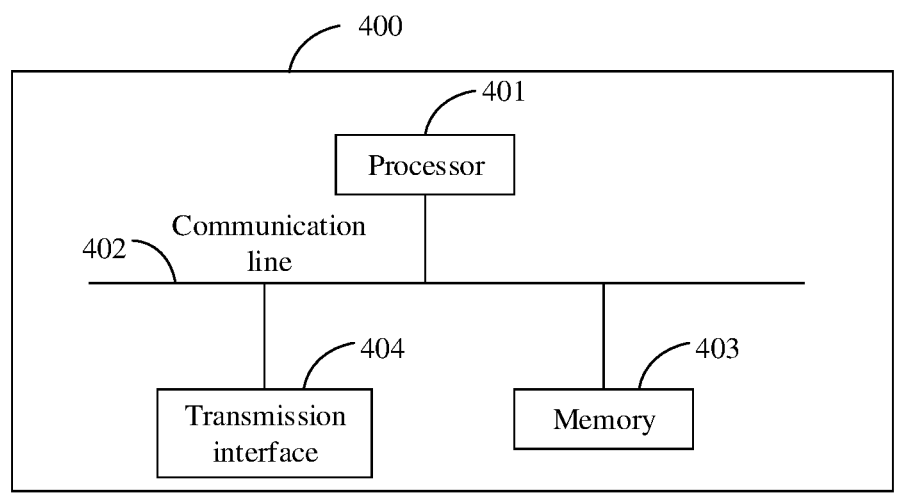
FIG. 4 is a schematic diagram of a structure of a signal processing apparatus according to an embodiment of this application.

The signal processing method provided in the embodiments of this application may be performed by a signal processing apparatus. The signal processing apparatus may be a primary node in a transformer district in FIG. 3 or an apparatus disposed in the primary node. Alternatively, the signal processing apparatus may be a secondary node in a transformer district in FIG. 3 or an apparatus disposed in the secondary node. FIG. 4 shows a hardware structure of the signal processing apparatus. As shown in FIG. 4, a signal processing apparatus 400 may include a processor 401, a communication line 402, a memory 403, and a transmission interface 404.

The structure illustrated in this embodiment of the present disclosure does not constitute a limitation on the signal processing apparatus 400. The signal processing apparatus 400 may include more or fewer components than those shown in the figure, or some components may be combined, or some components may be split, or different component arrangements may be used. The components shown in the figure may be implemented by hardware, software, or a combination of software and hardware.

The processor 401 may include one or more processing units. For example, the processor 401 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a decision maker that instructs the components of the signal processing apparatus 400 to coordinately work according to an instruction, and is a nerve center and a command center of the signal processing apparatus 400. The controller generates an operation control signal based on instruction operation code and a time sequence signal, to complete control of instruction reading and instruction execution.

A memory may be further disposed in the processor 401, and is configured to store instructions and data. In some embodiments, the memory in the processor is a cache, and may store an instruction or data that is just used or cyclically used by the processor. If the processor needs to reuse the instruction or the data, the processor may directly invoke the instruction or the data from the memory. This avoids repeated access and reduces waiting time of the processor, thereby improving system efficiency.

In some embodiments, the processor 401 may include an interface. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The communication line 402 is configured to transmit information between the processor 401 and the memory 403.

The memory 403 is configured to store and execute computer executable instructions, and the processor 401 controls execution.

The memory 403 may exist alone and be connected to the processor by using the communication line 402. The memory 403 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example and not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), and an enhanced synchronous dynamic random access memory (enhanced SDRAM, ESDRAM). It should be noted that the memory of the system and the device described in this specification is intended to include but is not limited to these memories or any other memories suitable for a service type.

The transmission interface 404 is configured to communicate with another device or a communication network. The communication network may be Ethernet, a radio access network (RAN), a wireless local area network (WLAN), Bluetooth (BT), a global navigation satellite system (GNSS), frequency modulation (FM), a near field communication (NFC) technology, an infrared (IR) technology, or the like.

Figure 5:
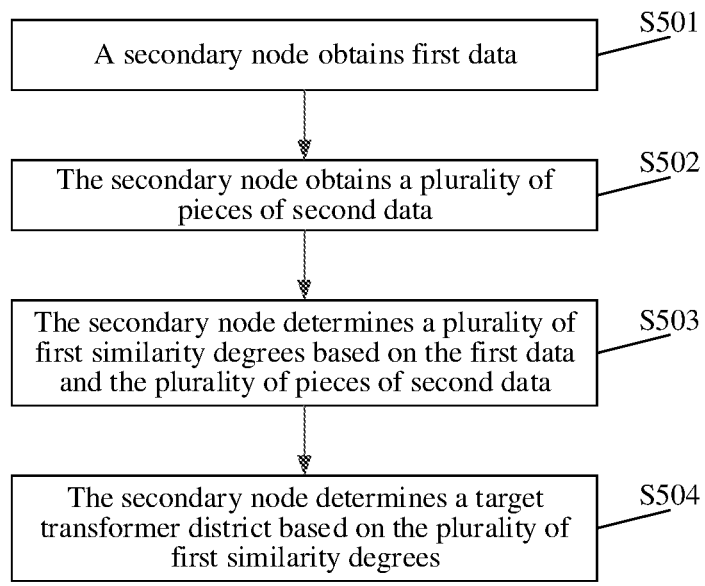
FIG. 5 is a schematic flowchart of a signal processing method according to an embodiment of this application.

FIG. 5 is a schematic flowchart of a signal processing method according to an embodiment of this application. The method may be applied to the power network shown in FIG. 3, and performed by the signal processing apparatus shown in FIG. 4. In this case, the signal processing apparatus shown in FIG. 4 is a secondary node in a transformer district shown in FIG. 3 or is disposed in the secondary node. As shown in FIG. 5, the signal processing method includes the following steps.

S501: A secondary node obtains first data.

The first data is power frequency cycle feature data collected by the secondary node in a target time period, and the power frequency cycle feature data is used to indicate a cycle feature of a power grid working frequency.

In this embodiment of this application, the power frequency cycle feature data includes N power frequency zero-crossing moments, and N is a positive integer. The target time period may be any time period.

Optionally, the power frequency zero-crossing moment may include at least one of the following: a zero-crossing point of a power frequency voltage rising edge, a zero-crossing point of a power frequency voltage falling edge, a zero-crossing point of a power frequency current rising edge, or a zero-crossing point of a power frequency current falling edge. For example, the power frequency zero-crossing moment may include only the zero-crossing point of the power frequency voltage falling edge.

For example, Table 3 shows the first data obtained by the secondary node. Referring to Table 3, it may be learned that the first data includes power frequency zero-crossing moments ($T_{11}$, $T_{12}$, $T_{13}$, $T_{14}$, and $T_{15}$) that are of five consecutive zero-crossing points (a zero-crossing point 1, a zero-crossing point 2, a zero-crossing point 3, a zero-crossing point 4, and a zero-crossing point 5) and that are collected by the secondary node in the target time period.

TABLE 3

| Zero-crossing point | 1 | 2 | 3 | 4 | 5 |
|---|---|---|---|---|---|
| Power frequency zero-crossing moment of the secondary node | $T_{11}$ | $T_{12}$ | $T_{13}$ | $T_{14}$ | $T_{15}$ |

S502: The secondary node obtains a plurality of pieces of second data.

The plurality of pieces of second data include power frequency cycle feature data respectively collected by a plurality of primary nodes in the target time period. The plurality of pieces of second data are in a one-to-one correspondence with the plurality of primary nodes. For example, the plurality of primary nodes include a primary node 1 and a primary node 2, and the plurality of pieces of second data include second data 1 and second data 2. In this case, the primary node 1 corresponds to the second data 1, and the primary node 2 corresponds to the second data 2.

For example, the plurality of primary nodes include a primary node 1 and a primary node 2. Table 4 shows second data 1 collected by the primary node 1 in the target time period and second data 2 collected by the primary node 2 in the target time period. Referring to Table 4, it may be learned that the second data 1 includes power frequency zero-crossing moments ($T_{21}$, $T_{22}$, $T_{23}$, $T_{24}$, and $T_{25}$) that are of five consecutive zero-crossing points and that are collected by the primary node 1 in the target time period, and the second data 2 includes power frequency zero-crossing moments ($T_{31}$, $T_{32}$, $T_{33}$, $T_{34}$, and $T_{35}$) that are of five consecutive zero-crossing points and that are collected by the primary node 2 in the target time period.

TABLE 4

| Zero-crossing point | 1 | 2 | 3 | 4 | 5 |
|---|---|---|---|---|---|
| Power frequency zero-crossing moment of the primary node 1 | $T_{21}$ | $T_{22}$ | $T_{23}$ | $T_{24}$ | $T_{25}$ |
| Power frequency zero-crossing moment of the primary node 2 | $T_{31}$ | $T_{32}$ | $T_{33}$ | $T_{34}$ | $T_{35}$ |

In a possible implementation, the secondary node may separately receive the second data respectively sent by the plurality of primary nodes. For example, the secondary node may first receive the second data 1 sent by the primary node 1, and then receive the second data 2 sent by the primary node 2.

In a possible implementation, before the secondary node obtains the second data, the secondary node may further transmit first indication information to the plurality of primary nodes. The first indication information is used to indicate the plurality of primary nodes to collect the power frequency cycle feature data in the target time period.

In this embodiment of this application, a non-synchronous primary node, namely, a primary node that cannot collect power frequency cycle feature data in the target time period, may exist in the plurality of primary nodes. Therefore, the plurality of pieces of second data may include second data that is not collected in the target time period.

S503: The secondary node determines a plurality of first similarity degrees based on the first data and the plurality of pieces of second data.

All of the plurality of first similarity degrees are respectively used to indicate similarity degrees between all of the plurality of pieces of second data and the first data. The plurality of first similarity degrees are in a one-to-one correspondence with the plurality of primary nodes.

For example, the plurality of primary nodes include a primary node 1 and a primary node 2. The secondary node may determine, based on the first data collected by the secondary node in the target time period in Table 5 and second data 1 collected by the primary node 1 in the target time period in Table 5, a first similarity degree 1 used to represent a similarity degree between the second data of the primary node 1 and the first data of the secondary node. Then, the secondary node determines, based on the first data collected by the secondary node in the target time period in Table 5 and second data 2 collected by the primary node 2 in the target time period in Table 5, a first similarity degree 2 used to represent a similarity degree between the second data of the primary node 2 and the first data of the secondary node.

TABLE 5

| Zero-crossing point | 1 | 2 | 3 | 4 | 5 |
|---|---|---|---|---|---|
| Power frequency zero-crossing moment (first data) of the secondary node | $T_{11}$ | $T_{12}$ | $T_{13}$ | $T_{14}$ | $T_{15}$ |
| Power frequency zero-crossing moment (second data 1) of the primary node 1 | $T_{21}$ | $T_{22}$ | $T_{23}$ | $T_{24}$ | $T_{25}$ |
| Power frequency zero-crossing moment (second data 2) of the primary node 2 | $T_{31}$ | $T_{32}$ | $T_{33}$ | $T_{34}$ | $T_{35}$ |

In this embodiment of this application, the secondary node may determine the plurality of similarity degrees in a plurality of manners. This is not limited in this embodiment of this application. For example, the secondary node may separately calculate a variance between each of the plurality of pieces of second data and the first data, and then use the variance between each piece of second data and the first data as a similarity degree corresponding to each primary node. For another example, the secondary node may separately calculate a similarity coefficient between each of the plurality of pieces of second data and the first data, and then use the similarity coefficient between each piece of second data and the first data as a similarity degree corresponding to each primary node.

Optionally, the secondary node may perform S501 to S503 for a plurality of times to determine a plurality of groups of first similarity degrees.

In this embodiment of this application, when the plurality of pieces of second data include second data that is not collected in the target time period, the secondary node needs to determine, based on power frequency cycle feature data collected by the secondary node and a non-synchronous primary node in a same time period, a first similarity degree corresponding to the non-synchronous primary node.

S504: The secondary node determines a target primary node based on the plurality of first similarity degrees.

In a possible implementation, the secondary node may first determine whether a first primary node meets a target condition. Then, when the first primary node meets the target condition, the secondary node determines that the first primary node is the target primary node. On the contrary, when the first primary node does not meet the target condition, the secondary node obtains first information of a plurality of transformer districts and determines the target primary node based on the first information of the plurality of transformer districts. The first primary node may be a primary node with a highest first similarity degree in the plurality of primary nodes. The plurality of transformer districts include transformer districts in which the plurality of primary nodes are located.

Optionally, the first information may include at least one of the following: a lowest effective layer, a signal-to-noise ratio SNR value, or an attenuation value.

It should be noted that a higher first similarity degree corresponding to a primary node indicates a higher similarity degree between a power frequency cycle feature of the primary node and a power frequency cycle feature of the secondary node. In other words, a higher first similarity degree corresponding to a primary node indicates a higher probability that the primary node and the secondary node are in a same transformer district. It is determined whether a primary node (the first primary node) with the highest first similarity degree in the plurality of primary nodes meets the first condition, so that it can be determined whether the power frequency cycle feature data of the plurality of primary nodes has a relatively high distinguishing degree.

When the first primary node meets the first condition, it indicates that the power frequency cycle feature data of the plurality of primary nodes has a relatively high distinguishing degree. Therefore, when the first primary node meets the first condition, the first primary node can be determined as the target primary node.

On the contrary, when the first primary node does not meet the first condition, it indicates that the power frequency cycle feature data of the plurality of primary nodes does not have a relatively high distinguishing degree. Therefore, when the first primary node does not meet the first condition, the target primary node may not be accurately determined by using only the power frequency cycle feature data of the plurality of primary nodes, and the target node needs to be determined by using the first information of the transformer districts of the plurality of primary nodes, to ensure that the target primary node can be accurately determined.

In a possible implementation, that the secondary node determines whether a first primary node meets a target condition may include: first, the secondary node determines a first difference based on the plurality of first similarity degrees; and when the first difference is greater than a first threshold, the secondary node determines that the first primary node meets the target condition; on the contrary, when the first difference is less than or equal to the first threshold, the secondary node determines that the first primary node does not meet the target condition. The first difference is a difference between a highest first similarity degree in the plurality of first similarity degrees and a second highest first similarity degree in the plurality of first similarity degrees.

It should be noted that, when the first difference is greater than the first threshold, it indicates that a power frequency cycle feature of each primary node other than the first primary node in the plurality of primary nodes is not similar to the power frequency cycle feature of the secondary node. In this case, power frequency cycle features of the primary nodes have a relatively high distinguishing degree, and a user-transformer relationship can be accurately identified by using the power frequency cycle features of the plurality of primary nodes. Therefore, the first primary node can be determined as the target primary node.

On the contrary, when the first difference is less than or equal to the first threshold, it indicates that a primary node whose first similarity degree approximates to that of the first primary node exists in the plurality of primary nodes. In this case, a power frequency cycle feature of the primary node is also extremely similar to the power frequency cycle feature of the secondary node, and the primary node may also be the target primary node. In this case, the power frequency cycle features do not have a relatively high distinguishing degree, and a user-transformer relationship may not be accurately identified by using the power frequency cycle features of the plurality of primary nodes.

For example, the plurality of primary nodes include a primary node 1, a primary node 2, and a primary node 3, the first threshold is 5, a first similarity degree 1 of the primary node 1 is 89, a first similarity degree 2 of the primary node 2 is 87, and a first similarity degree 3 of the primary node 3 is 80. It may be learned that, in the foregoing three first similarity degrees, the first similarity degree 1 is the highest, and the first similarity degree 2 is the second highest. In this case, it may be determined that the primary node 1 is the first primary node, and the first difference is 89−87=2. It may be learned that the first difference (2) is less than the first threshold (5). Therefore, the secondary node can determine that the primary node 1 does not meet the target condition.

In another possible implementation, that the secondary node determines whether a first primary node meets a target condition may include: first, the secondary node determines a plurality of second similarity degrees based on the plurality of pieces of second data; and then, when all the plurality of second similarity degrees are less than a second threshold, the secondary node determines that the first primary node meets the target condition; on the contrary, when not all the plurality of second similarity degrees are less than the second threshold, the secondary node determines that the first primary node does not meet the target condition. The plurality of second similarity degrees are respectively used to indicate similarity degrees between second data of all primary nodes other than the first primary node in the plurality of primary nodes and second data of the first primary node.

It should be noted that, when all the plurality of second similarity degrees are less than the second threshold, it indicates that similarity degrees between power frequency cycle features of the plurality of primary nodes except the first primary node and a power frequency cycle feature of the first primary node are not very high. In this case, power frequency cycle features have a relatively high distinguishing degree, and a user-transformer relationship can be accurately identified by using the power frequency cycle features of the plurality of primary nodes. Therefore, the first primary node can be determined as the target primary node.

On the contrary, when all the plurality of second similarity degrees are greater than or equal to the second threshold, it indicates that a primary node whose power frequency cycle feature approximates to that of the first primary node exists in the plurality of primary nodes except the first primary node. In this case, the primary node may also be the target primary node. In this case, power frequency cycle features of the primary nodes do not have a relatively high distinguishing degree, and a user-transformer relationship may not be accurately identified by using the power frequency cycle features of the plurality of primary nodes.

For example, the plurality of primary nodes include a primary node 1, a primary node 2, and a primary node 3, the primary node 1 is the first primary node, and the second threshold is 80. The secondary node may determine, based on the plurality of pieces of second data, that a second similarity degree 1 used to represent a similarity degree between a power frequency cycle feature of the primary node 2 and the power frequency cycle feature of the first primary node is 89, and a second similarity degree 2 used to represent a similarity degree between a power frequency cycle feature of the primary node 3 and the power frequency cycle feature of the first primary node is 75. It may be learned that the second similarity degree 1 (89) is greater than the second threshold (80). Therefore, the secondary node can determine that the primary node 1 does not meet the target condition.

In another possible implementation, the secondary node may determine the first primary node based on the plurality of groups of first similarity degrees. Then, when the first primary node meets the target condition, the secondary node determines that the first primary node is the target primary node.

In this embodiment of this application, the secondary node may determine, based on first similarity degrees corresponding to any two primary nodes in the plurality of groups of first similarity degrees, a value relationship between probabilities that the two primary nodes are the first primary node; and when a probability that a primary node is the first primary node is higher than probabilities that all the primary nodes except the primary node are the first primary node, determine that the primary node is the first primary node.

For example, the plurality of primary nodes include a primary node 1 and a primary node 2, first similarity degrees corresponding to the two primary nodes are respectively a first similarity degree 1 and a first similarity degree 2, and the plurality of groups of first similarity degrees include three groups of first similarity degrees. Values of a first similarity degree 1 and a second similarity degree 2 in each of the three groups of first similarity degrees may be compared. If the first similarity degree 1 is greater than the second similarity degree 2, a score of the primary node 1 is increased by 1; or if the first similarity degree 1 is less than the second similarity degree 2, a score of the primary node 2 is increased by 1. After comparison between all first similarity degrees 1 and first similarity degrees 2 in the three groups of first similarity degrees are completed, a value relationship between a score of the primary node 1 and a score of the primary node 2 is determined. If the score of the primary node 1 is greater than the score of the primary node 2, it is determined that a probability that the primary node 1 is the first primary node is greater than a probability that the primary node 2 is the first primary node; on the contrary, if the score of the primary node 2 is greater than the score of the primary node 1, it is determined that a probability that the primary node 2 is the first primary node is greater than a probability that the primary node 1 is the first primary node. An initial value of the score of the primary node 1 is the same as that of the score of the primary node 2.

For another example, the plurality of primary nodes include a primary node 1 and a primary node 2, first similarity degrees corresponding to the two primary nodes are respectively a first similarity degree 1 and a first similarity degree 2, and the plurality of groups of first similarity degrees include three groups of first similarity degrees. A ratio of a first similarity degree 1 to a first similarity degree 2 in each of the three groups of first similarity degrees is determined to obtain three ratios, and then an average value of the three ratios is determined. If the average value is greater than 1, it is determined that a probability that the primary node 1 is the first primary node is greater than a probability that the primary node 2 is the first primary node; on the contrary, if the average value is less than 1, it is determined that a probability that the primary node 2 is the first primary node is greater than a probability that the primary node 1 is the first primary node.

In this embodiment of this application, in a scenario in which a non-synchronous primary node exists in the plurality of primary nodes, when a value relationship between probabilities that any two primary nodes are the first primary node is determined by using first similarity degrees corresponding to the two primary nodes in the plurality of groups of first similarity degrees, it needs to be first determined whether second data of the two primary nodes in a plurality of pieces of second data corresponding to each group of first similarity degrees is synchronous data. If an interval between start moments of collection time periods of the two primary nodes is less than a preset threshold, it is determined that the second data of the two primary nodes is synchronous data; or if the interval between the start moments of the collection time periods of the two primary nodes is greater than the preset threshold, it is determined that the second data of the two primary nodes is non-synchronous data.

For example, the plurality of primary nodes include a primary node 1 and a primary node 2, first similarity degrees corresponding to the two primary nodes are respectively a first similarity degree 1 and a first similarity degree 2, and the plurality of groups of first similarity degrees include three groups of first similarity degrees. Values of a first similarity degree 1 and a second similarity degree 2 in each of the three groups of first similarity degrees may be compared.

If the first similarity degree 1 is greater than the second similarity degree 2 and second data that is of the primary node 1 and the primary node 2 and that corresponds to the group of first similarity degrees is synchronous data, a score of the primary node 1 is increased by 10 points; if the first similarity degree 1 is less than the second similarity degree 2 and second data that is of the primary node 1 and the primary node 2 and that corresponds to the group of first similarity degrees is synchronous data, a score of the primary node 2 is increased by 10 points; if the first similarity degree 1 is greater than the second similarity degree 2 and second data that is of the primary node 1 and the primary node 2 and that corresponds to the group of first similarity degrees is non-synchronous data, a score of the primary node 1 is increased by 1 point; or if the first similarity degree 1 is greater than the second similarity degree 2 and second data that is of the primary node 1 and the primary node 2 and that corresponds to the group of first similarity degrees is non-synchronous data, a score of the primary node 1 is increased by 1 point. After comparison between all first similarity degrees 1 and first similarity degrees 2 in the three groups of first similarity degrees are completed, a value relationship between a score of the primary node 1 and a score of the primary node 2 is determined; and if the score of the primary node 1 is greater than the score of the primary node 2, it is determined that a probability that the primary node 1 is the first primary node is greater than a probability that the primary node 2 is the first primary node; on the contrary, if the score of the primary node 2 is greater than the score of the primary node 1, it is determined that a probability that the primary node 2 is the first primary node is greater than a probability that the primary node 1 is the first primary node. An initial value of the score of the primary node 1 is the same as that of the score of the primary node 2.

If second data of any one of the plurality of primary nodes and the second data of the first primary node are non-synchronous data, a second similarity degree corresponding to the primary node and the first primary node may not be determined, or a difference between a first similarity degree corresponding to the primary node and a first similarity degree corresponding to the first primary node may be determined as a second similarity degree corresponding to the primary node and the first primary node.

In a possible implementation, that the secondary node obtains first information of a plurality of transformer districts includes: first, the secondary node obtains a plurality of target packets; then, the secondary node determines second information of a plurality of first nodes based on the plurality of target packets; and finally, the secondary node determines the first information of the plurality of transformer districts based on the second information of the plurality of first nodes.

The target packets are packets sent by a plurality of nodes in the plurality of transformer districts within preset time. The first node is a node that meets a first condition in the plurality of nodes. The second information includes a transformer district identifier, a layer, an SNR value, and an attenuation value.

Optionally, the first condition includes at least one of the following: a quantity of corresponding target packets is greater than a sixth threshold, an SNR value is greater than a seventh threshold, or an attenuation value is less than an eighth threshold.

In this embodiment of this application, the secondary node may obtain a set of target data based on each obtained target packet. As shown in Table 6, the target data may include a node identifier, a transformer district identifier, a layer, an SNR value, and an attenuation value. The node identifier may indicate a node that sends the target packet, the transformer district identifier may indicate a transformer district of the node that sends the target packet, the layer may indicate a layer of the node that sends the target packet in the transformer district, the SNR value is used to represent an SNR value of the target packet in a transmission process, and the attenuation value is used to represent an attenuation value of the target packet in a transmission process.

TABLE 6

| Node identifier | Transformer district identifier | Layer | SNR value | Attenuation value |
| --- | --- | --- | --- | --- |

In a possible implementation, when receiving a target packet, the secondary node collects statistics on signal strength that is of the target packet and that is obtained when the target packet is received and noise strength that is of the target packet and that is obtained when the target packet is received, and determines that a signal-to-noise ratio corresponding to the target packet is a ratio of the signal strength to the noise strength.

In a possible implementation, when receiving a target packet, the secondary node collects statistics on signal strength that is of the target packet and that is obtained when the target packet is received. Because the signal strength of the packet is fixed and known when the packet is transmitted, the secondary node can determine an attenuation value of the packet in a transmission process based on signal strength that is of the packet and that is obtained when the packet is transmitted and received.

Optionally, the secondary node may determine second information of each node based on a target packet sent by the node. For example, a node 1 sends a plurality of target packets, and the secondary node may determine an SNR value of the node 1 based on a plurality of SNR values corresponding to the plurality of packets, and determine an attenuation value of the node 1 based on a plurality of attenuation values corresponding to the plurality of packets. The secondary node may determine the SNR value of the node by using a statistical accumulated average value, a statistical recent-time-period average value, a statistical multi-time-period average value, a real-time value obtained through alpha filtering, or the like of the plurality of SNR values (or attenuation values) corresponding to the plurality of packets corresponding to the node.

In a possible implementation, that the secondary node determines the first information of the plurality of transformer districts based on the second information of the plurality of first nodes includes: the secondary node determines a lowest effective layer of a first transformer district based on layers of a plurality of first nodes in the first transformer district; the secondary node determines an SNR value of the first transformer district based on SNR values of the plurality of first nodes in the first transformer district; and the secondary node determines an attenuation value of the first transformer district based on attenuation values of the plurality of first nodes in the first transformer district. The first transformer district is any one of the plurality of transformer districts. The lowest effective layer of the first transformer district is a layer of a second node in the first transformer district, and the second node in the first transformer district is a node at a lowest layer in the plurality of first nodes in the first transformer district.

For example, a transformer district 1 includes 80 first nodes at a layer 1 and 160 first nodes at a layer 2. It may be learned that the lowest effective layer of the transformer district 1 is 1. The secondary node determines an SNR value of the layer 1 of the transformer district 1 based on a weighted average value of SNR values of 50% (40) first nodes with largest SNR values in the 80 first nodes at the layer 1. The secondary node determines an SNR value of the layer 2 of the transformer district 1 based on a weighted average value of SNR values of 50% (80) first nodes with largest SNR values in the 160 first nodes at the layer 2. Then, the secondary node determines an SNR value of the transformer district 1 based on a weighted average value of the SNR value of the layer 1 of the transformer district 1 and the SNR value of the layer 2 of the transformer district 1. Then, the secondary node determines an attenuation value of the layer 1 of the transformer district 1 based on a weighted average value of attenuation values of 50% (40) first nodes with largest attenuation values in the 80 first nodes at the layer 1. The secondary node determines an attenuation value of the layer 2 of the transformer district 1 based on a weighted average value of attenuation values of 50% (80) first nodes with largest attenuation values in the 160 first nodes at the layer 2. Then, the secondary node determines an attenuation value of the transformer district 1 based on a weighted average value of the attenuation value of the layer 1 of the transformer district 1 and the attenuation value of the layer 2 of the transformer district 1.

In another possible implementation, that the secondary node determines the first information of the plurality of transformer districts based on the second information of the plurality of first nodes includes: the secondary node determines a lowest effective layer of a first transformer district based on layers of a plurality of first nodes in the first transformer district; the secondary node determines an SNR value of the first transformer district based on an SNR value of a second node in the first transformer district; and the secondary node determines an attenuation value of the first transformer district based on an attenuation value of the second node in the first transformer district.

For example, a transformer district 1 includes 80 first nodes at a layer 1 and 160 first nodes at a layer 2. It may be learned that a lowest effective layer of the transformer district 1 is 1, and the first nodes at the layer 1 in the transformer district 1 are second nodes in the transformer district 1. The secondary node determines an SNR value of the transformer district 1 based on a weighted average value of SNR values of the 80 first nodes at the layer 1. The secondary node determines an attenuation value of the transformer district 1 based on a weighted average value of attenuation values of the 80 first nodes at the layer 1.

In a possible implementation, the determining the target primary node based on the first information of the plurality of transformer districts includes: when there is only one second transformer district in the plurality of transformer districts, the secondary node determines that a primary node in the second transformer district is the target primary node; on the contrary, when there are a plurality of second transformer districts in the plurality of transformer districts, the secondary node determines the target primary node based on SNR values of the plurality of second transformer districts and attenuation values of the plurality of second transformer districts. The second transformer district is a transformer district whose lowest effective layer is the lowest in the plurality of transformer districts.

It should be noted that a lowest effective layer of a transformer district may be used to represent a communication distance between the transformer district and the secondary node. A lower lowest effective layer of a transformer district indicates a shorter communication distance between the transformer district and the secondary node. That is, the transformer district whose lowest effective layer is the lowest in the plurality of transformer districts is a transformer district at a shortest communication distance with the secondary node in the plurality of transformer districts. When there is only one second transformer district in the plurality of transformer districts, it indicates that there is only one transformer district at a shortest communication distance with the secondary node in the plurality of transformer districts. In this case, lowest effective layers of the transformer districts have a relatively high distinguishing degree. Therefore, a primary node in the second transformer district can be determined as the target primary node.

However, when there are a plurality of second transformer districts in the plurality of transformer districts, it indicates that there are a plurality of transformer districts at a shortest communication distance with the secondary node in the plurality of transformer districts. In this case, lowest effective layers of the transformer districts do not have a relatively high distinguishing degree, and the target primary node may not be accurately determined based on only the lowest effective layers of the transformer districts. In this case, the secondary node may determine the target primary node based on SNR values of the plurality of second transformer districts and attenuation values of the plurality of second transformer districts.

For example, the plurality of transformer districts include a transformer district 1, a transformer district 2, and a transformer district 3, a lowest effective layer of the transformer district 1 is 1, a lowest effective layer of the transformer district 2 is 2, and a lowest effective layer of the transformer district 3 is 2. It may be learned that the effective layer of the transformer district 1 in the plurality of transformer districts is the lowest. Because a second transformer district includes only the transformer district 1, the secondary node determines that a primary node in the transformer district 1 is the target primary node.

For another example, the plurality of transformer districts include a transformer district 1, a transformer district 2, and a transformer district 3, a lowest effective layer of the transformer district 1 is 1, a lowest effective layer of the transformer district 2 is 1, and a lowest effective layer of the transformer district 3 is 2. It may be learned that the lowest effective layers of the transformer district 1 and the transformer district 2 in the plurality of transformer districts are the lowest. Because second transformer districts include a plurality of (two) transformer districts, the secondary node determines the target primary node based on SNR values of the plurality of transformer districts (the transformer district 1 and the transformer district 2) and attenuation values of the plurality of second transformer districts.

In a possible implementation, that the secondary node may determine the target primary node based on SNR values of the plurality of second transformer districts and attenuation values of the plurality of second transformer districts may include: the secondary node determines a second difference based on the SNR values of the plurality of second transformer districts; and if the second difference is greater than or equal to a third threshold, the secondary node determines the target primary node based on the SNR values of the plurality of second transformer districts; on the contrary, if the second difference is less than the third threshold, the secondary node determines the target primary node based on the attenuation values of the plurality of second transformer districts. The second difference is a difference between an SNR value of a third transformer district and an SNR value of a fourth transformer district, the third transformer district is a second transformer district with a largest SNR value in the plurality of second transformer districts, and the fourth transformer district is a transformer district with a second largest SNR value in the plurality of second transformer districts.

For example, when the second difference is greater than or equal to the third threshold, the secondary node determines that the target primary node is a primary node in the third transformer district; on the contrary, when the second difference is less than the third threshold, the secondary node determines that the target primary node is a primary node in a transformer district with a smaller attenuation value in the third transformer district and the fourth transformer district.

It should be noted that a larger SNR value of a transformer district indicates stronger association between the transformer district and the secondary node. When the second difference is greater than or equal to the third threshold, it indicates that there is a relatively large SNR value difference between the transformer district (the third transformer district) with the largest SNR value and the transformer district (the fourth transformer district) with the second largest SNR value in the plurality of second transformer districts. In this case, the SNR values of the plurality of second transformer districts have a relatively high distinguishing degree. Therefore, the target primary node can be determined based on the SNR values of the plurality of second transformer districts.

On the contrary, when the second difference is less than the third threshold, it indicates that there is a relatively small SNR value difference between the third transformer district and the fourth transformer district. In this case, the SNR values of the plurality of second transformer districts do not have a relatively high distinguishing degree. A smaller attenuation value of a transformer district indicates smaller attenuation between the transformer district and the secondary node. Therefore, when the SNR values of the plurality of second transformer districts do not have a relatively high distinguishing degree, the secondary node may determine the target primary node based on the attenuation values of the plurality of second transformer districts.

In another possible implementation, that the secondary node may determine the target primary node based on SNR values of the plurality of second transformer districts and attenuation values of the plurality of second transformer districts may include: if an attenuation value of a fifth transformer district is less than a fourth threshold, the secondary node determines the target primary node based on the attenuation values of the plurality of second transformer districts; on the contrary, if the attenuation value of the fifth transformer district is greater than or equal to the fourth threshold, the secondary node determines the target primary node based on the SNR values of the plurality of second transformer districts. The fifth transformer district is a transformer district with a smallest attenuation value in the plurality of second transformer districts.

Optionally, the fourth threshold may be 50, or may be another value. This is not limited in this embodiment of this application.

For example, when the attenuation value of the fifth transformer district is less than the fourth threshold, the secondary node determines that the target primary node is a primary node in the fifth transformer district; on the contrary, when the attenuation value of the fifth transformer district is greater than or equal to the fourth threshold, the secondary node determines that the target primary node is a primary node in a sixth transformer district. The sixth transformer district is a transformer district with a largest SNR value in the second transformer districts.

It should be noted that, when the attenuation value of the fifth transformer district is less than the fourth threshold, it indicates that a transformer district whose attenuation value is less than the fourth threshold exists in the plurality of second transformer districts. When the attenuation value is less than the fourth threshold, it indicates that there is good correlation between the attenuation value and a channel. That is, in this case, the attenuation values have a relatively high distinguishing degree. Therefore, in this case, the target primary node can be determined based on the attenuation values of the plurality of second transformer districts.

On the contrary, when the attenuation value of the fifth transformer district is greater than or equal to the fourth threshold, it indicates that no transformer district whose attenuation value is less than the fourth threshold exists in the plurality of second transformer districts. In this case, the attenuation values do not have a relatively high distinguishing degree, and the target primary node cannot be accurately determined based on the attenuation values. Therefore, the target primary node can be determined based on the SNR values of the plurality of second transformer districts.

In still another possible implementation, that the secondary node may determine the target primary node from the plurality of second transformer districts based on SNR values of the plurality of second transformer districts and attenuation values of the plurality of second transformer districts may include: if an SNR value of the sixth transformer district is greater than a fifth threshold, the secondary node determines the target primary node based on the SNR values of the plurality of second transformer districts; on the contrary, if the SNR value of the sixth transformer district is less than or equal to the fifth threshold, the secondary node determines the target primary node based on the attenuation values of the plurality of second transformer districts.

Optionally, the fifth threshold may be 15, or may be another value. This is not limited in this embodiment of this application.

For example, when the SNR value of the sixth transformer district is greater than the fifth threshold, the secondary node determines that the target primary node is the primary node in the sixth transformer district; on the contrary, when the SNR value of the sixth transformer district is less than or equal to the fifth threshold, the secondary node determines that the target primary node is the primary node in the fifth transformer district.

It should be noted that, when the SNR value of the sixth transformer district is greater than the fifth threshold, it indicates that a transformer district whose SNR value is greater than the fifth threshold exists in the plurality of second transformer districts. When the SNR value is greater than the fifth threshold, it indicates that there is relatively good correlation between the SNR value and a channel. That is, in this case, the SNR values of the plurality of second transformer districts have a relatively high distinguishing degree. Therefore, in this case, the target primary node can be determined based on the SNR values of the plurality of second transformer districts.

On the contrary, when the SNR value of the sixth transformer district is less than or equal to the fifth threshold, it indicates that no transformer district whose SNR value is greater than the fifth threshold exists in the plurality of second transformer districts. In this case, the SNR values of the plurality of second transformer districts do not have a relatively high distinguishing degree, and the target primary node cannot be accurately determined based on the SNR values. Therefore, the target primary node is determined based on the attenuation values of the plurality of second transformer districts.

It may be learned from S501 to S504 that, according to the signal processing method provided in this embodiment of this application, power frequency cycle feature data respectively collected by the secondary node and the plurality of primary nodes in a same time period (the target time period) may be obtained, and then the target primary node may be determined based on the power frequency cycle feature data respectively collected by the secondary node and the plurality of primary nodes in the same time period. Power frequency cycle feature data respectively collected by the plurality of primary nodes in the same time period has a higher distinguishing degree than power frequency cycle feature data respectively collected by the plurality of primary nodes in different time periods. Therefore, the signal processing method provided in this application has higher accuracy compared with an existing user-transformer relationship identification method, and therefore can effectively improve accuracy of user-transformer relationship identification, and can provide a reliable basis for calculating line loss electricity.

Figure 6:
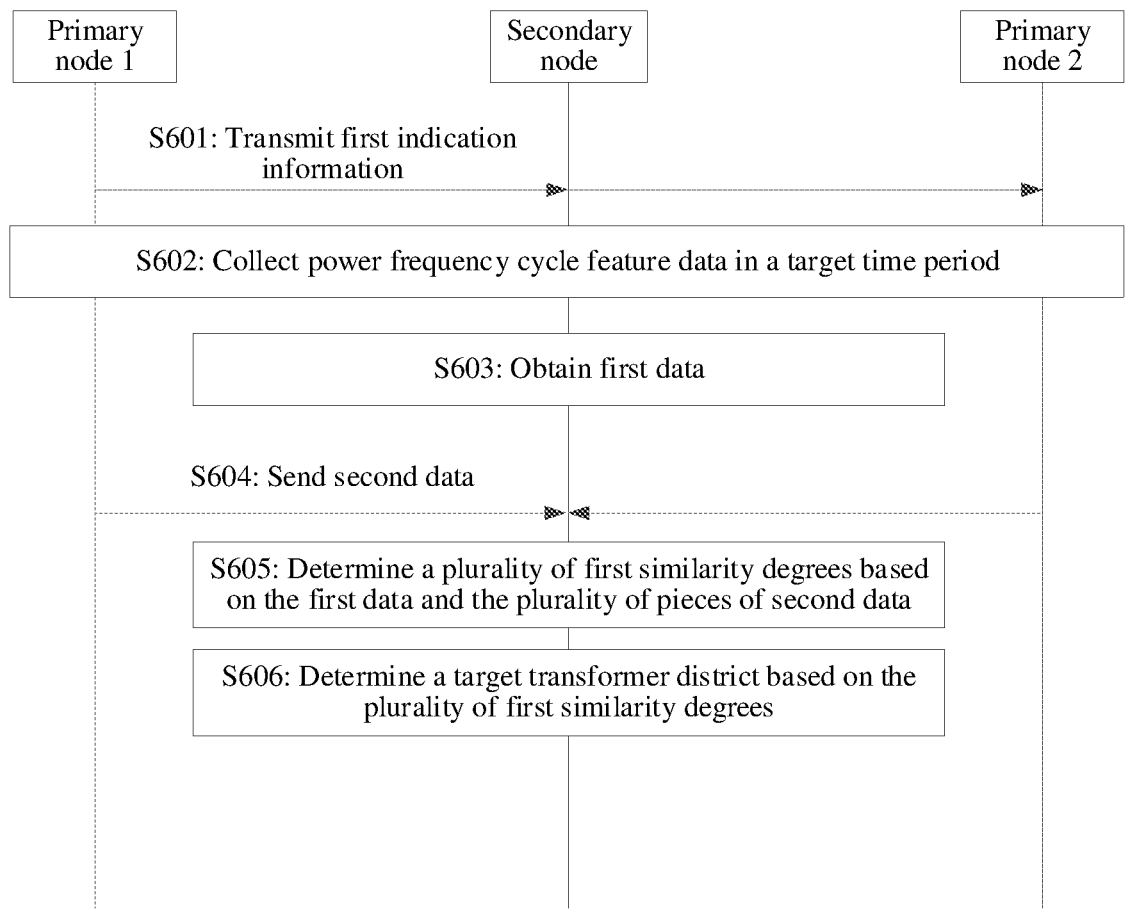
FIG. 6 is a schematic flowchart of another signal processing method according to an embodiment of this application.

FIG. 6 is a schematic flowchart of a signal processing method according to an embodiment of this application. The method may be applied to the power network shown in FIG. 3. Communication interaction between a secondary node and a primary node in the signal processing method provided in this embodiment of this application is described in detail below with reference to FIG. 6. The communication interaction between the secondary node and the primary node specifically includes the following steps.

S601: A secondary node transmits first indication information to a plurality of primary nodes The first indication information is used to indicate each of the plurality of primary nodes to collect power frequency cycle feature data in a target time period. The power frequency cycle feature data is used to indicate a cycle feature of a power grid working frequency.

For example, the plurality of primary nodes include a primary node 1 and a primary node 2 shown in FIG. 6. The primary node 1 sends the first indication information to the secondary node, and the secondary node receives the first indication information and forwards the first indication information to the primary node 2.

Optionally, a source transmitter of the first indication information may be a fourth primary node in the plurality of primary nodes, that is, the first indication information is sent by the fourth primary node to the secondary node and then forwarded by the secondary node to a primary node other than the fourth primary node in the plurality of primary nodes. The fourth primary node may be a primary node with a largest medium access control (MAC) address in the plurality of primary nodes.

In a possible implementation, the plurality of primary nodes may send, to each other, first messages that carry collection time periods and target information of the plurality of primary nodes, and the plurality of primary nodes update the collection time periods of the plurality of primary nodes based on the received first messages.

Optionally, the target information may include a MAC address and a synchronization information sequence number that are prestored by each primary node.

In a possible implementation, if a MAC address in a first message received by any one of the plurality of primary nodes is greater than a MAC address prestored by the primary node, the primary node updates a collection time period of the primary node to a collection time period in the first message, updates the prestored MAC address to the MAC address in the first message, and stores a synchronization information sequence number in the first message.

In another possible implementation, if a MAC address in a first message received by any one of the plurality of primary nodes is equal to a MAC address prestored by the primary node and a synchronization information sequence number in the first message is greater than a synchronization information sequence number stored by the primary node, the primary node updates a collection time period of the primary node to a collection time period in the first message, and updates the stored synchronization information sequence number to the synchronization information sequence number in the first message.

In still another possible implementation, if a MAC address in a first message received by any one of the plurality of primary nodes is equal to a MAC address prestored by the primary node and a synchronization information sequence number in the first message is less than or equal to a synchronization information sequence number stored by the primary node, the primary node does not update a collection time period and the prestored MAC address of the primary node.

In yet another possible implementation, if a MAC address in a first message received by any one of the plurality of primary nodes is less than a MAC address prestored by the primary node, the primary node does not update a collection time period and the prestored MAC address of the primary node.

It is worthwhile to note that, if a MAC address in a first message received by a primary node is equal to a MAC address of the primary node, it indicates that another primary node updates a collection time period of the primary node based on a collection time period of the primary node. Each time the primary node sends a first message to the another primary node, the primary node increases a value of a synchronization information sequence number in the first message, so that the another primary node can distinguish between a new first message and an old first message by using the value of the synchronization information sequence number in the first message.

It may be understood that, the plurality of primary nodes send, to each other, the first messages that carry the collection time periods and the target information of the plurality of primary nodes, so that the collection time periods of the plurality of primary nodes can be synchronized, so that the plurality of primary nodes collect, in a same time period, data that represents power frequency cycle features of the plurality of primary nodes.

S602: The secondary node and the plurality of primary nodes respectively collect respective power frequency cycle feature data in the target time period.

S603: The secondary node obtains first data.

The first data is power frequency cycle feature data collected by the secondary node in the target time period.

S604: The plurality of primary nodes respectively send second data to the secondary node. Correspondingly, the secondary node receives the plurality of pieces of second data.

The plurality of pieces of second data include the power frequency cycle feature data respectively collected by the plurality of primary nodes in the target time period. The plurality of pieces of second data are in a one-to-one correspondence with the plurality of primary nodes.

S605: The secondary node determines a plurality of first similarity degrees based on the first data and the plurality of pieces of second data.

The plurality of first similarity degrees are used to respectively indicate similarity degrees between all of the plurality of pieces of second data and the first data, and the plurality of first similarity degrees are in a one-to-one correspondence with the plurality of primary nodes.

S606: The secondary node determines a target primary node based on the plurality of first similarity degrees.

For a specific implementation of S606, refer to the foregoing description of S504. Details are not described herein again.

Figure 7:
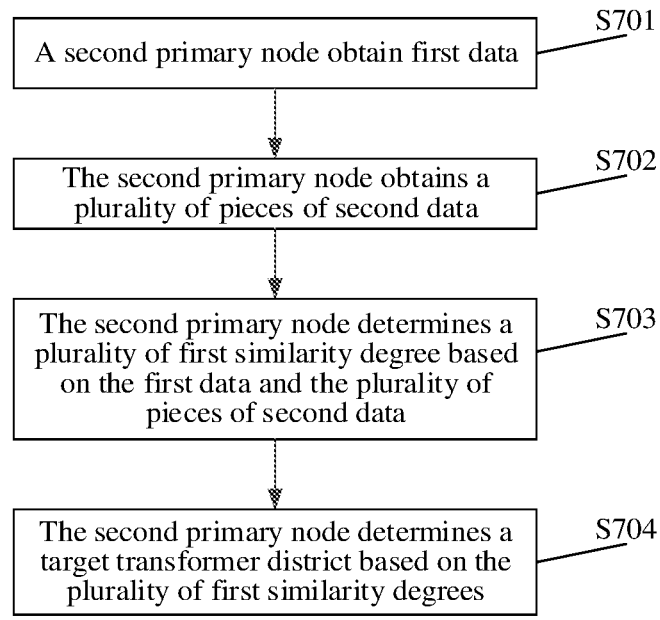
FIG. 7 is a schematic flowchart of still another signal processing method according to an embodiment of this application.

FIG. 7 is a schematic flowchart of a signal processing method according to an embodiment of this application. The method may be applied to the power network shown in FIG. 3, and performed by the signal processing apparatus shown in FIG. 4. In this case, the signal processing apparatus shown in FIG. 7 is a primary node in a transformer district shown in FIG. 3 or is disposed in the primary node. As shown in FIG. 7, the signal processing method includes the following steps.

S701: A second primary node obtains first data.

The first data is power frequency cycle feature data collected by a secondary node in a target time period, and the power frequency cycle feature data is used to indicate a cycle feature of a power grid working frequency.

S702: The second primary node obtains a plurality of pieces of second data.

The plurality of pieces of second data include power frequency cycle feature data respectively collected by a plurality of primary nodes in the target time period, the plurality of primary nodes include the second primary node, and the plurality of pieces of second data are in a one-to-one correspondence with the plurality of primary nodes.

Optionally, before obtaining the plurality of pieces of second data, the second primary node may further send second indication information to third primary nodes. The second indication information is used to indicate the third primary nodes to collect power frequency cycle feature data in the target time period, and the third primary nodes include all primary nodes other than the second primary node in the plurality of primary nodes.

S703: The second primary node determines a plurality of first similarity degrees based on the first data and the plurality of pieces of second data.

All of the plurality of first similarity degrees are respectively used to indicate similarity degrees between all of the plurality of pieces of second data and the first data, and the plurality of first similarity degrees are in a one-to-one correspondence with the plurality of primary nodes.

S704: The second primary node determines a target primary node based on the plurality of first similarity degrees.

In a possible implementation, the second primary node may first determine whether a first primary node meets a target condition. Then, when the first primary node meets the target condition, the second primary node determines that the first primary node is the target primary node. On the contrary, when the first primary node does not meet the target condition, the second primary node obtains first information of a plurality of transformer districts and determines the target primary node based on the first information of the plurality of transformer districts. The first primary node is a primary node with a highest first similarity degree in the plurality of primary nodes. The plurality of transformer districts include a transformer district of each of the plurality of primary nodes.

Optionally, the first information may include at least one of the following: a lowest effective layer, an SNR value, or an attenuation value.

In another possible implementation, the second primary node may first determine whether a first primary node meets a target condition. Then, when the first primary node meets the target condition, the second primary node determines that the first primary node is the target primary node. On the contrary, when the first primary node does not meet the target condition, the first primary node sends a first request to the secondary node and receives a first result sent by the secondary node. The first request is used to request a target result, and the target result is used to indicate the target primary node.

In this embodiment of this application, after the secondary node receives the first request sent by the second primary node, first, the secondary node obtains first information of a plurality of transformer districts; then, the secondary node determines the target primary node based on the first information of the plurality of transformer districts; and then, the secondary node sends the target result to the second primary node. For a specific implementation in which the secondary node determines the target primary node based on the first information of the plurality of transformer districts, refer to the foregoing description of S504. Details are not described herein again.

In a possible implementation, that the second primary node determines whether a first primary node meets a target condition may include: first, the second primary node determines a first difference based on the plurality of first similarity degrees; and when the first difference is greater than a first threshold, the second primary node determines that the first primary node meets the target condition; on the contrary, when the first difference is less than or equal to the first threshold, the second primary node determines that the first primary node does not meet the target condition. The first difference is a difference between a highest first similarity degree in the plurality of first similarity degrees and a second highest first similarity degree in the plurality of first similarity degrees.

In another possible implementation, that the second primary node determines whether a first primary node meets a target condition may include: first, the second primary node determines a plurality of second similarity degrees based on the plurality of pieces of second data; and then, when all the plurality of second similarity degrees are less than a second threshold, the second primary node determines that the first primary node meets the target condition; on the contrary, when not all the plurality of second similarity degrees are less than the second threshold, the second primary node determines that the first primary node does not meet the target condition. The plurality of second similarity degrees are respectively used to indicate similarity degrees between second data of all primary nodes other than the first primary node in the plurality of primary nodes and second data of the first primary node.

In a possible implementation, that the second primary node obtains first information of a plurality of transformer districts includes: the second primary node sends a second request to the secondary node, and then the second primary node receives the first information of the plurality of transformer districts that is sent by the secondary node. The second request is used to request the first information of the plurality of transformer districts.

In this embodiment of this application, after receiving the second request sent by the second primary node, the secondary node sends the first information of the plurality of transformer districts to the second primary node.

In a possible implementation, the determining the target primary node based on the first information of the plurality of transformer districts includes: when there is only one second transformer district in the plurality of transformer districts, the second primary node determines that a primary node in the second transformer district is the target primary node; on the contrary, when there are a plurality of second transformer districts in the plurality of transformer districts, the second primary node determines the target primary node based on SNR values of the plurality of second transformer districts and attenuation values of the plurality of second transformer districts. The second transformer district is a transformer district whose lowest effective layer is the lowest in the plurality of transformer districts.

In a possible implementation, that the second primary node may determine the target primary node based on SNR values of the plurality of second transformer districts and attenuation values of the plurality of second transformer districts may include: the second primary node determines a second difference based on the SNR values of the plurality of second transformer districts; and if the second difference is greater than or equal to a third threshold, the second primary node determines the target primary node based on the SNR values of the plurality of second transformer districts; on the contrary, if the second difference is less than the third threshold, the second primary node determines the target primary node based on the attenuation values of the plurality of second transformer districts. The second difference is a difference between an SNR value of a third transformer district and an SNR value of a fourth transformer district, the third transformer district is a second transformer district with a largest SNR value in the plurality of second transformer districts, and the fourth transformer district is a transformer district with a second largest SNR value in the plurality of second transformer districts.

In another possible implementation, that the second primary node may determine the target primary node from the plurality of second transformer districts based on SNR values of the plurality of second transformer districts and attenuation values of the plurality of second transformer districts may include: if an attenuation value of a fifth transformer district is less than a fourth threshold, the second primary node determines the target primary node based on the attenuation values of the plurality of second transformer districts; on the contrary, if the attenuation value of the fifth transformer district is greater than or equal to the fourth threshold, the second primary node determines the target primary node based on the SNR values of the plurality of second transformer districts. The fifth transformer district is a transformer district with a smallest attenuation value in the plurality of second transformer districts.

In still another possible implementation, that the second primary node may determine the target primary node from the plurality of second transformer districts based on SNR values of the plurality of second transformer districts and attenuation values of the plurality of second transformer districts may include: if an SNR value of a sixth transformer district is greater than a fifth threshold, the second primary node determines the target primary node based on the SNR values of the plurality of second transformer districts; on the contrary, if the SNR value of the sixth transformer district is less than or equal to the fifth threshold, the second primary node determines the target primary node based on the attenuation values of the plurality of second transformer districts. The sixth transformer district is a transformer district with a largest SNR value in the second transformer districts.

Figure 8:
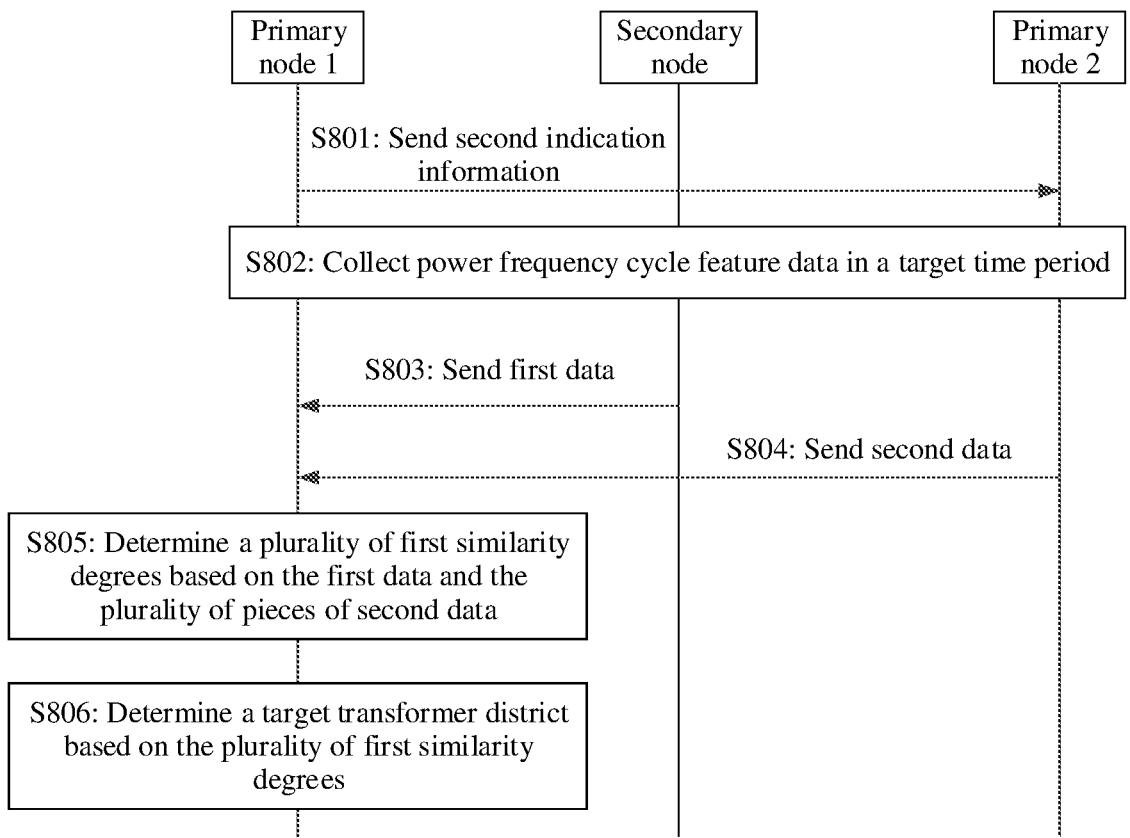
FIG. 8 is a schematic flowchart of yet another signal processing method according to an embodiment of this application.

FIG. 8 is a schematic flowchart of a signal processing method according to an embodiment of this application. The method may be applied to the power network shown in FIG. 3. Communication interaction between a secondary node and a primary node in the signal processing method provided in this embodiment of this application is described in detail below with reference to FIG. 8. The communication interaction between the secondary node and the primary node specifically includes the following steps.

S801: A second primary node sends second indication information to third primary nodes.

The second indication information is used to indicate each of the third primary nodes to collect power frequency cycle feature data in a target time period, and the third primary nodes include all primary nodes other than the second primary node in a plurality of primary nodes.

For example, the second primary node is a primary node 1 shown in FIG. 8, the third primary nodes include a primary node 2 shown in FIG. 8, and the primary node 1 sends the second indication information to the primary node 2.

S802: The plurality of primary nodes and a secondary node respectively collect respective power frequency cycle feature data in the target time period.

The plurality of primary nodes include the second primary node.

S803: The secondary node sends first data to the second primary node.

Correspondingly, the second primary node receives the first data.

The first data is power frequency cycle feature data collected by the secondary node in the target time period.

S804: The third primary nodes send second data to the second primary node.

Correspondingly, the second primary node receives the second data sent by the third primary nodes.

For example, the second primary node is the primary node 1 shown in FIG. 8, the third primary nodes include the primary node 2 shown in FIG. 8, and the primary node 2 sends second data to the primary node 1.

Optionally, the third primary node may directly send the second data to the second primary node, or the third primary node may send the second data to the second primary node by using the secondary node, that is, the third primary node first sends the second data to the secondary node, and then the secondary node forwards the second data to the second primary node.

S805: The second primary node determines a plurality of first similarity degrees based on the first data and the plurality of pieces of second data.

The plurality of pieces of second data include power frequency cycle feature data respectively collected by the plurality of primary nodes in the target time period. The plurality of pieces of second data are in a one-to-one correspondence with the plurality of primary nodes, and the plurality of primary nodes include the second primary node and the third primary node. The plurality of first similarity degrees are used to respectively indicate similarity degrees between all of the plurality of pieces of second data and the first data, and the plurality of first similarity degrees are in a one-to-one correspondence with the plurality of primary nodes.

S806: The second primary node determines a target primary node based on the plurality of first similarity degrees.

For a specific implementation of S806, refer to the foregoing description of S704. Details are not described herein again.

An embodiment of this application further provides a computer storage medium. The computer storage medium stores computer instructions. When the computer instructions are run on a signal processing apparatus, the signal processing apparatus is enabled to perform the foregoing related method steps to implement the signal processing method in the foregoing embodiments.

An embodiment of this application further provides a computer program product. When the computer program product is run on a computer, the computer is enabled to perform the foregoing related steps to implement the signal processing method in the foregoing embodiments.

An embodiment of this application further provides a signal processing apparatus. The apparatus may be specifically a chip, an integrated circuit, a component, or a module. Specifically, the apparatus may include a connected processor and a memory configured to store instructions, or the apparatus includes at least one processor, configured to obtain instructions from an external memory. When the apparatus runs, the processor may execute the instructions, so that a chip performs the signal processing method in the foregoing method embodiments.

Figure 9:
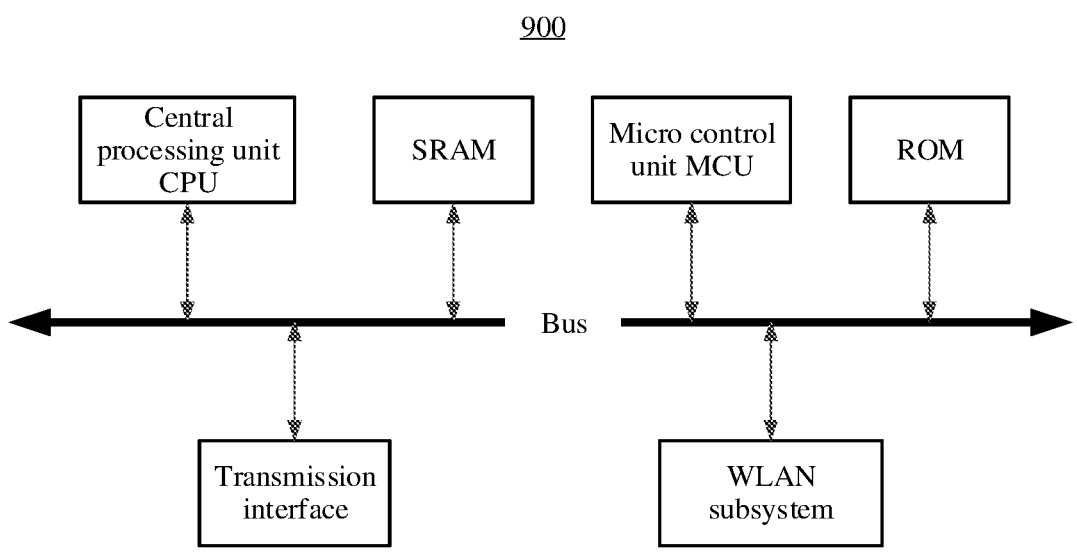
FIG. 9 is a schematic diagram of a structure of a chip according to an embodiment of this application.

FIG. 9 is a schematic diagram of a structure of another signal processing apparatus according to an embodiment of this application. The signal processing apparatus may be the foregoing secondary node or the foregoing second primary node. A signal processing apparatus 900 includes at least one CPU, memories, a micro control unit (Micro controller Unit, MCU), a WLAN subsystem, a bus, or a transmission interface. Types of the memories may include, for example, an SRAM and a ROM Although not shown in FIG. 9, the signal processing apparatus 900 may further include other dedicated processors such as an application processor (AP) and an NPU, and other subsystems such as a power management subsystem, a clock management subsystem, and a power consumption management subsystem.

The foregoing parts of the signal processing apparatus 900 are coupled by using a connector. For example, the connector includes various interfaces, transmission lines, or buses. These interfaces are usually electrical communication interfaces, but may be alternatively mechanical interfaces or interfaces in other forms. This is not limited in this embodiment.

Optionally, the CPU may be a single-core (single-CPU) processor or a multi-core (multi-CPU) processor. Optionally, the CPU may be a processor group including a plurality of processors, and the plurality of processors are coupled to each other by using one or more buses. In an optional case, the CPU implements any signal processing method according to the foregoing method embodiments by invoking program instructions stored in an on-chip memory or an off-chip memory. In an optional case, the CPU and the MCU jointly implement any signal processing method according to the foregoing method embodiments. For example, the CPU completes some steps in the signal processing method, and the MCU completes other steps in the signal processing method. In an optional case, the AP or another dedicated processor implements any signal processing method according to the foregoing method embodiments by invoking program instructions stored in an on-chip memory or an off-chip memory.

The transmission interface may be a data receiving and sending interface of a processor chip. The transmission interface usually includes a plurality of types of interfaces. In an optional case, the transmission interface may include an inter-integrated circuit (I2C) interface, a serial peripheral interface (SPI), a universal asynchronous receiver-transmitter (UART) interface, a general-purpose input/output (GPIO) interface, or the like. It should be understood that these interfaces may implement different functions by multiplexing a same physical interface.

In an optional case, the transmission interface may alternatively include a high definition multimedia interface (HDMI), a V-By-One interface, an embedded display port (eDP), a mobile industry processor interface (MIPI), a Display Port (DP), or the like.

In an optional case, the foregoing parts are integrated onto a same chip. In another optional case, the memory may be an independent chip.

The WLAN subsystem may include, for example, a radio frequency circuit and a baseband.

The chip in the embodiments of this application is a system manufactured on a same semiconductor substrate by using an integrated circuit technology, and is also referred to as a semiconductor chip. The chip may be a set of integrated circuits formed on the substrate (which is usually a semiconductor material such as silicon) by using the integrated circuit technology, and an outer layer of the chip is usually packaged with a semiconductor packaging material. The integrated circuit may include various types of functional components. Each type of functional component includes a transistor such as a logic gate circuit, a metal-oxide-semiconductor (MOS) transistor, a bipolar transistor, or a diode, or may include another component such as a capacitor, a resistor, or an inductor. Each functional component may independently operate or operate under the action of necessary driver software, and may implement various functions such as communication, operation, or storage.

The signal processing apparatus, the computer storage medium, and the computer program product provided in the embodiments are all configured to perform the corresponding method provided above. Therefore, for beneficial effects that can be achieved by the signal processing apparatus, the computer storage medium, and the computer program product, refer to the beneficial effects in the corresponding method provided above. Details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this application, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the system, apparatus, and unit described above, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The foregoing units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, which is a secondary node or which is included in the secondary node, comprising a processor and a memory coupled to the processor, wherein the memory is configured to store a computer program, and wherein the processor is configured to execute the computer program stored in the memory, to cause the apparatus to perform operations, comprising:

obtaining first data, wherein the first data is power frequency cycle feature data collected by the secondary node in a target time period, and the power frequency cycle feature data indicates a cycle feature of a power grid working frequency;

obtaining a plurality of pieces of second data, wherein the plurality of pieces of second data comprise power frequency cycle feature data respectively collected by a plurality of primary nodes in the target time period, and the plurality of pieces of second data are in a one-to-one correspondence with the plurality of primary nodes;

determining a plurality of first similarity degrees based on the first data and the plurality of pieces of second data, wherein the plurality of first similarity degrees are in a one-to-one correspondence with the plurality of primary nodes; and determining a target primary node based on the plurality of first similarity degrees, wherein the target primary node is one of the plurality of primary nodes.

2. The apparatus according to claim 1, wherein the power frequency cycle feature data comprises N power frequency zero-crossing moments, N is a positive integer, and each of the power frequency zero-crossing moments includes a zero-crossing moment of a power frequency voltage rising edge, a zero-crossing moment of a power frequency voltage falling edge, a zero-crossing moment of a power frequency current rising edge, or a zero-crossing moment of a power frequency current falling edge.

3. The apparatus according to claim 1, wherein the operations further comprise, before the plurality of pieces of second data are obtained, transmitting first indication information to the plurality of primary nodes, wherein the first indication information indicates each of the plurality of primary nodes to collect power frequency cycle feature data in the target time period.

4. The apparatus according to claim 1, wherein the determining a target primary node based on the plurality of first similarity degrees comprises:

determining whether a first primary node meets a target condition, wherein the first primary node is a primary node with a highest first similarity degree in the plurality of primary nodes; and if the first primary node meets the target condition, determining that the first primary node is the target primary node; or if the first primary node does not meet the target condition, obtaining first information of a plurality of transformer districts and determining the target primary node based on the first information of the plurality of transformer districts, wherein the plurality of transformer districts comprise transformer districts in which the plurality of primary nodes are located, and the first information comprises at least one of a lowest effective layer, a signal-to-noise ratio (SNR) value, or an attenuation value.

5. The apparatus according to claim 4, wherein the determining whether a first primary node meets a target condition comprises:

determining a first difference based on the plurality of first similarity degrees, wherein the first difference is a difference between the highest first similarity degree in the plurality of first similarity degrees and a second highest first similarity degree in the plurality of first similarity degrees; and determining that the first primary node meets the target condition if either:

the first difference is greater than a first threshold, or all of a plurality of second similarity degrees are less than a second threshold, wherein the plurality of second similarity degrees is determined based on the plurality of pieces of second data, wherein the plurality of second similarity degrees respectively indicates similarity degrees between second data corresponding to all primary nodes other than the first primary node in the plurality of primary nodes and second data corresponding to the first primary node.

6. The apparatus according to claim 4, wherein the obtaining first information of a plurality of transformer districts comprises:

obtaining a plurality of target packets, wherein the target packets are packets sent by a plurality of nodes in the plurality of transformer districts within a preset time interval;

determining second information of each first node of a plurality of first nodes in the plurality of transformer districts based on the plurality of target packets, wherein the second information comprises a transformer district identifier, a layer, an SNR value, and an attenuation value, and the each first node is a node that meets a first condition in the plurality of nodes; and determining the first information of the plurality of transformer districts based on the second information of the plurality of first nodes.

7. The apparatus according to claim 6, wherein the first condition comprises at least one of:

a quantity of packets sent to the secondary node within the preset time interval is greater than a first threshold, an SNR value is greater than a second threshold, or an attenuation value is less than a third threshold.

8. The apparatus according to claim 6, wherein the determining the first information of the plurality of transformer districts based on the second information of the plurality of first nodes comprises:

determining a lowest effective layer of a first transformer district based on layers of a plurality of first nodes in the first transformer district, wherein the first transformer district is any one of the plurality of transformer districts;

determining an SNR value of the first transformer district based on SNR values of the plurality of first nodes in the first transformer district or an SNR value of a second node, wherein the second node is a node at a lowest layer in the plurality of first nodes in the first transformer district; and determining an attenuation value of the first transformer district based on attenuation values of the plurality of first nodes in the first transformer district or an attenuation value of the second node.

9. The apparatus according to claim 4, wherein the determining the target primary node based on the first information of the plurality of transformer districts comprises:

if there is only one second transformer district in the plurality of transformer districts, determining that a primary node in the second transformer district is the target primary node, wherein the second transformer district is a transformer district whose lowest effective layer is the lowest in the plurality of transformer districts; or if there are a plurality of second transformer districts in the plurality of transformer districts, determining the target primary node based on SNR values of the plurality of second transformer districts and attenuation values of the plurality of second transformer districts.

10. The apparatus according to claim 9, wherein the determining the target primary node based on SNR values of the plurality of second transformer districts and attenuation values of the plurality of second transformer districts comprises:

determining a second difference based on the SNR values of the plurality of second transformer districts, wherein the second difference is a difference between an SNR value of a third transformer district and an SNR value of a fourth transformer district, the third transformer district is a transformer district with a largest SNR value in the plurality of second transformer districts, and the fourth transformer district is a transformer district with a second largest SNR value in the plurality of second transformer districts; and if the second difference is greater than or equal to a third threshold, determining the target primary node based on the SNR values of the plurality of second transformer districts; or if the second difference is less than the third threshold, determining the target primary node based on the attenuation values of the plurality of second transformer districts; or if an attenuation value of a fifth transformer district is less than a fourth threshold, determining the target primary node based on the attenuation values of the plurality of second transformer districts, wherein the fifth transformer district is a transformer district with a smallest attenuation value in the plurality of second transformer districts; or if the attenuation value of the fifth transformer district is greater than or equal to the fourth threshold, determining the target primary node based on the SNR values of the plurality of second transformer districts; or if an SNR value of a sixth transformer district is greater than a fifth threshold, determining the target primary node based on the SNR values of the plurality of second transformer districts, wherein the sixth transformer district is a transformer district with a largest SNR value in the plurality of second transformer districts; or if the SNR value of the sixth transformer district is less than or equal to the fifth threshold, determining the target primary node based on the attenuation values of the plurality of second transformer districts.

11. An apparatus, which is a second primary node or which is included in the second primary node, comprising a processor and a memory coupled to the processor,
wherein the memory is configured to store a computer program, and wherein
the processor is configured to execute the computer program stored in the memory to cause the apparatus to perform operations comprising:
obtaining first data, wherein the first data is power frequency cycle feature data collected by a secondary node in a target time period, and the power frequency cycle feature data indicates a cycle feature of a power grid working frequency;
obtaining a plurality of pieces of second data, wherein the plurality of pieces of second data comprise power frequency cycle feature data respectively collected by a plurality of primary nodes in the target time period, the plurality of primary nodes comprise the second primary node, and the plurality of pieces of second data are in a one-to-one correspondence with the plurality of primary nodes;
determining a plurality of first similarity degrees based on the first data and the plurality of pieces of second data, wherein the plurality of first similarity degrees are in a one-to-one correspondence with the plurality of primary nodes; and
determining a target primary node based on the plurality of first similarity degrees, wherein the target primary node is one of the plurality of primary nodes.

12. The apparatus according to claim 11, wherein the power frequency cycle feature data comprises N power frequency zero-crossing moments, N is a positive integer, and each of the zero-crossing moments includes a zero-crossing moment of a power frequency voltage rising edge, a zero-crossing moment of a power frequency voltage falling edge, a zero-crossing moment of a power frequency current rising edge, or a zero-crossing moment of a power frequency current falling edge.

13. The apparatus according to claim 11, wherein the operations further comprise, before the second primary node obtains the plurality of pieces of second data,
sending second indication information to third primary nodes, wherein the second indication information indicates each of the third primary nodes to collect power frequency cycle feature data in the target time period, and the third primary nodes comprise all primary nodes other than the second primary node in the plurality of primary nodes.

14. The apparatus according to claim 11, wherein the determining a target primary node based on the plurality of first similarity degrees comprises:
determining whether a first primary node meets a target condition, wherein the first primary node is a primary node with a highest first similarity degree in the plurality of primary nodes; and
if the first primary node meets the target condition, determining that the first primary node is the target primary node; or
if the first primary node does not meet the target condition, obtaining first information of a plurality of transformer districts and determining the target primary node based on the first information of the plurality of transformer districts, or sending a first request to the secondary node and receiving a first result sent by the secondary node, wherein the plurality of transformer districts comprise transformer districts in which the plurality of primary nodes are located, the first information comprises at least one of a lowest effective layer, an SNR value, or an attenuation value, the first request is used to request a target result, and the target result is used to indicate the target primary node.

15. The apparatus according to claim 14, wherein the determining whether a first primary node meets a target condition comprises:
determining a first difference based on the plurality of first similarity degrees, wherein the first difference is a difference between the highest first similarity degree in the plurality of first similarity degrees and a second highest first similarity degree in the plurality of first similarity degrees; and
determining that the first primary node meets the target condition if either:
the first difference is greater than a first threshold, or
all of a plurality of second similarity degrees are less than a second threshold, wherein
the plurality of second similarity degrees is determined based on the plurality of pieces of second data, wherein the plurality of second similarity degrees respectively indicates similarity degrees between second data corresponding to all primary nodes other than the first primary node in the plurality of primary nodes and second data corresponding to the first primary node.

16. The apparatus according to claim 14, wherein the obtaining first information of a plurality of transformer districts comprises:
sending a second request to the secondary node, wherein the second request requests the first information of the plurality of transformer districts; and
receiving the first information of the plurality of transformer districts that is sent by the secondary node.

17. The apparatus according to claim 14, wherein the determining the target primary node based on the first information of the plurality of transformer districts comprises:
- if there is only one second transformer district in the plurality of transformer districts, determining that a primary node in the second transformer district is the target primary node, wherein the second transformer district is a transformer district whose lowest effective layer is the lowest in the plurality of transformer districts; or
- if there are a plurality of second transformer districts in the plurality of transformer districts, determining the target primary node based on SNR values of the plurality of second transformer districts and attenuation values of the plurality of second transformer districts.

18. An apparatus, which is a second node or which is included in the second node, comprising a processor and a memory coupled to the processor,
- wherein the memory is configured to store a computer program, and wherein
- the processor is configured to execute the computer program stored in the memory to cause the apparatus to perform operations comprising:
- receiving a first request sent by a second primary node, wherein the first request requests a target result, and the target result indicates a target primary node;
- obtaining first information of a plurality of transformer districts, wherein the plurality of transformer districts comprise transformer districts in which a plurality of primary nodes are located, the plurality of primary nodes are in a one-to-one correspondence with the plurality of transformer districts, and the first information comprises at least one of a lowest effective layer, an SNR value, or an attenuation value;
- determining the target primary node based on the first information of the plurality of transformer districts, wherein the target primary node is one of the plurality of primary nodes; and
- sending the target result to the second primary node, wherein the plurality of primary nodes comprise the second primary node.

19. The apparatus according to claim 18, wherein the obtaining first information of a plurality of transformer districts comprises:
- obtaining a plurality of target packets, wherein the target packets are packets sent by a plurality of nodes in the plurality of transformer districts within a preset time interval;
- determining second information of each first node of a plurality of first nodes in the plurality of transformer districts based on the plurality of target packets, wherein the second information comprises a transformer district identifier, a layer, an SNR value, and an attenuation value, and the each first node is a node that meets a first condition in the plurality of nodes; and
- determining the first information of the plurality of transformer districts based on the second information of the plurality of first nodes.

20. The apparatus according to claim 18, wherein the determining the first information of the plurality of transformer districts based on the second information of the plurality of first nodes comprises:
- determining a lowest effective layer of a first transformer district based on layers of a plurality of first nodes in the first transformer district, wherein the first transformer district is any one of the plurality of transformer districts;
- determining an SNR value of the first transformer district based on SNR values of the plurality of first nodes in the first transformer district or an SNR value of a second node, wherein the second node is a node at a lowest layer in the plurality of first nodes in the first transformer district; and
- determining an attenuation value of the first transformer district based on attenuation values of the plurality of first nodes in the first transformer district or an attenuation value of the second node.

* * * * *